(12) United States Patent
Cech et al.

(10) Patent No.: US 7,388,370 B2
(45) Date of Patent: Jun. 17, 2008

(54) MAGNETIC CRASH SENSOR

(75) Inventors: Leonard S. Cech, Brighton, MI (US);
W. Todd Watson, Belleville, MI (US);
Hiroshi Aoki, Ritto (JP); Dana A. Stonebrook, Plymouth, MI (US)

(73) Assignee: Automotive Systems Laboratory Systems, Inc., Farmington Hills, MI (US)

( * ) Notice: Subject to any disclaimer, the term of this patent is extended or adjusted under 35 U.S.C. 154(b) by 0 days.

(21) Appl. No.: 11/460,982

(22) Filed: Jul. 29, 2006

(65) Prior Publication Data

US 2007/0024277 A1 Feb. 1, 2007

Related U.S. Application Data

(60) Provisional application No. 60/595,718, filed on Jul. 29, 2005.

(51) Int. Cl.
*G01N 27/72* (2006.01)
*G01N 27/82* (2006.01)
*G01R 33/12* (2006.01)
*G08B 13/24* (2006.01)

(52) U.S. Cl. .................. 324/239; 324/228; 324/240; 340/551

(58) Field of Classification Search .............. 701/45–48, 701/1, 36; 340/522; 324/209, 228, 233, 324/239, 240, 207.16, 207.17; 280/735; 180/232
See application file for complete search history.

(56) References Cited

U.S. PATENT DOCUMENTS

| | | | |
|---|---|---|---|
| 1,813,746 A | 7/1931 | Kinsley |
| 2,552,722 A | 5/1951 | King |
| 2,867,118 A | 1/1959 | Cavanagh |
| 3,848,243 A | 11/1974 | Schirmer |
| 3,870,948 A | 3/1975 | Holt et al. |
| 3,945,459 A | 3/1976 | Oishi et al. |
| 4,087,782 A | 5/1978 | Oishi et al. |
| 4,178,979 A | 12/1979 | Birat |
| 4,446,741 A | 5/1984 | Sirokorad et al. |

(Continued)

FOREIGN PATENT DOCUMENTS

DE 43 00 653 A1 1/1992

(Continued)

OTHER PUBLICATIONS

Kwun, H., "Magnetostrictive Sensors Technology", reprinted from Technology Today, Mar. 1995, pp. 3-7, which includes "Back in Style: Magnetostrictive Sensors" reprinted from Sep. 1991.

(Continued)

*Primary Examiner*—Reena Aurora
*Assistant Examiner*—Kenneth J Whittington
(74) *Attorney, Agent, or Firm*—Raggio & Dinnin, P.C.

(57) ABSTRACT

At least one time-varying signal is applied to a plurality of coil elements in cooperative relationship with and spanning different portions of a vehicle. The coil elements generate an associated plurality of magnetic field components that interact with the vehicle. At least one detection circuit generates a detected signal responsive to signal components from the coil elements so as to provide for detecting a change in a magnetic condition of the vehicle.

60 Claims, 11 Drawing Sheets

U.S. PATENT DOCUMENTS

| | | | |
|---|---|---|---|
| 4,531,091 A | 7/1985 | Kusenberger et al. | |
| 4,561,314 A | 12/1985 | Alley et al. | |
| 4,630,229 A | 12/1986 | D'Hondt | |
| 4,651,093 A | 3/1987 | Detriche' et al. | |
| 4,706,020 A | 11/1987 | Viertl et al. | |
| 4,706,073 A | 11/1987 | Vila Masot | |
| 4,802,368 A | 2/1989 | Nordvall | |
| 4,823,621 A | 4/1989 | Sobel | |
| 4,855,677 A | 8/1989 | Clark, Jr. et al. | |
| 4,866,418 A | 9/1989 | Dobler et al. | |
| 4,893,077 A | 1/1990 | Auchterlonie | |
| 4,951,023 A | 8/1990 | Erd et al. | |
| 4,952,855 A | 8/1990 | Meins et al. | |
| 4,991,301 A | 2/1991 | Hore | |
| 5,007,295 A | 4/1991 | Gustafsson et al. | |
| 5,068,608 A | 11/1991 | Clark, Jr. | |
| 5,097,253 A | 3/1992 | Eschbach et al. | |
| 5,144,846 A | 9/1992 | Klauber et al. | |
| 5,177,370 A | 1/1993 | Meister | |
| 5,182,513 A | 1/1993 | Young et al. | |
| 5,281,780 A | 1/1994 | Haland | |
| 5,399,968 A | 3/1995 | Sheppard et al. | |
| 5,437,197 A | 8/1995 | Uras et al. | |
| 5,445,412 A | 8/1995 | Gillis et al. | |
| 5,525,907 A | 6/1996 | Frazier | |
| 5,559,431 A | 9/1996 | Sellen | |
| 5,570,903 A | 11/1996 | Meister et al. | |
| 5,580,084 A | 12/1996 | Gioutsos | |
| 5,583,435 A | 12/1996 | Takemoto et al. | |
| 5,629,619 A | 5/1997 | Mednikov | |
| 5,683,103 A | 11/1997 | Blackburn et al. | |
| 5,707,076 A | 1/1998 | Takahashi | |
| 5,739,757 A | 4/1998 | Gioutsos | |
| 5,747,696 A | 5/1998 | Kwun et al. | |
| 5,767,766 A | 6/1998 | Kwun | |
| 5,793,200 A | 8/1998 | Berrill | |
| 5,793,206 A | 8/1998 | Goldfine et al. | |
| 5,838,233 A | 11/1998 | Hawes et al. | |
| 5,895,439 A | 4/1999 | Fisher et al. | |
| 5,940,003 A | 8/1999 | Schulz | |
| 5,966,011 A | 10/1999 | Goldfine et al. | |
| RE36,427 E | 12/1999 | Gioutsos | |
| 6,005,392 A | 12/1999 | Patzwaldt | |
| 6,018,980 A | 2/2000 | Kimura et al. | |
| 6,039,345 A | 3/2000 | Cech et al. | |
| 6,175,232 B1 | 1/2001 | de Coulon et al. | |
| 6,246,230 B1 | 6/2001 | Mednikov | |
| 6,252,393 B1 | 6/2001 | Hedengren | |
| 6,288,536 B1 | 9/2001 | Mandl et al. | |
| 6,288,537 B1 | 9/2001 | Viertl et al. | |
| 6,294,912 B1 | 9/2001 | Kwun | |
| 6,317,048 B1 | 11/2001 | Bomya et al. | |
| 6,329,910 B1 | 12/2001 | Farrington | |
| 6,351,120 B2 | 2/2002 | Goldfine | |
| 6,366,200 B1 | 4/2002 | Aoki | |
| 6,396,262 B2 | 5/2002 | Light et al. | |
| 6,407,660 B1 | 6/2002 | Bomya | |
| 6,407,669 B1 | 6/2002 | Brown et al. | |
| 6,433,688 B1 | 8/2002 | Bomya | |
| 6,462,535 B1 | 10/2002 | Schwabe | |
| 6,462,536 B1 | 10/2002 | Mednikov et al. | |
| 6,476,605 B1 | 11/2002 | de Coulon | |
| 6,479,990 B2 | 11/2002 | Mednikov et al. | |
| 6,552,662 B1 | 4/2003 | Bomya et al. | |
| 6,583,616 B1 | 6/2003 | Bomya | |
| 6,586,926 B1 | 7/2003 | Bomya | |
| 6,587,048 B1 | 7/2003 | Bomya | |
| 6,631,776 B1 | 10/2003 | Bomya | |
| 6,639,402 B2 * | 10/2003 | Grimes et al. | 324/239 |
| 6,777,927 B1 | 8/2004 | Bomya | |
| 6,812,697 B2 | 11/2004 | McKnight et al. | |
| 7,113,874 B2 | 9/2006 | Watson et al. | |
| 7,164,349 B2 * | 1/2007 | Kawaura et al. | 340/435 |
| 7,190,161 B2 | 3/2007 | Bomya | |
| 2002/0003421 A1 | 1/2002 | Kawata et al. | |
| 2002/0126004 A1 | 9/2002 | Gioutsos et al. | |
| 2004/0061617 A1 | 4/2004 | Gioutsos et al. | |
| 2004/0075429 A1 | 4/2004 | Hiroshima | |
| 2005/0007108 A1 | 1/2005 | Dogaru | |
| 2005/0093540 A1 | 5/2005 | Merrick et al. | |
| 2005/0096815 A1 | 5/2005 | Takafuji et al. | |
| 2005/0127908 A1 | 6/2005 | Schlicker et al. | |
| 2005/0143944 A1 | 6/2005 | Cech et al. | |
| 2005/0154530 A1 | 7/2005 | Hosokawa et al. | |
| 2007/0024277 A1 | 2/2007 | Cech et al. | |

FOREIGN PATENT DOCUMENTS

| | | |
|---|---|---|
| DE | 4300653 A1 | 7/1993 |
| EP | 0 453 824 A1 | 10/1991 |
| EP | 0560396 B1 | 9/1993 |
| EP | 0 453 824 B1 | 9/1994 |
| GB | 1567600 A | 5/1980 |
| GB | 2063485 A | 6/1981 |
| GB | 2353362 A | 2/2001 |
| JP | 56-157802 A | 5/1981 |
| WO | 2006/005766 A1 | 1/2006 |

OTHER PUBLICATIONS

Uras, M. H., "Signal Detection Methods for Magnetostrictive Sensors", 970604, reprinted from Sensors and Actuators 1997, SP-1220, Society of Automotive Engineers, Feb. 24, 1997, pp. 23-33.

Buckley, J. M., "An Introduction to Eddy Current Testing theory and technology,", technical paper eddyc.pdf available from the internet at http://joe.buckley.net/papers, downloaded on Sep. 8, 2003.

NDT Resource Center, Internet web pages at http://www.ndt-ed.org/EducationResources/CommunityCollege/EddyCurrents/cc_ec_index.htm, NDT Resource Center, downloaded on Oct. 13, 2005.

* cited by examiner

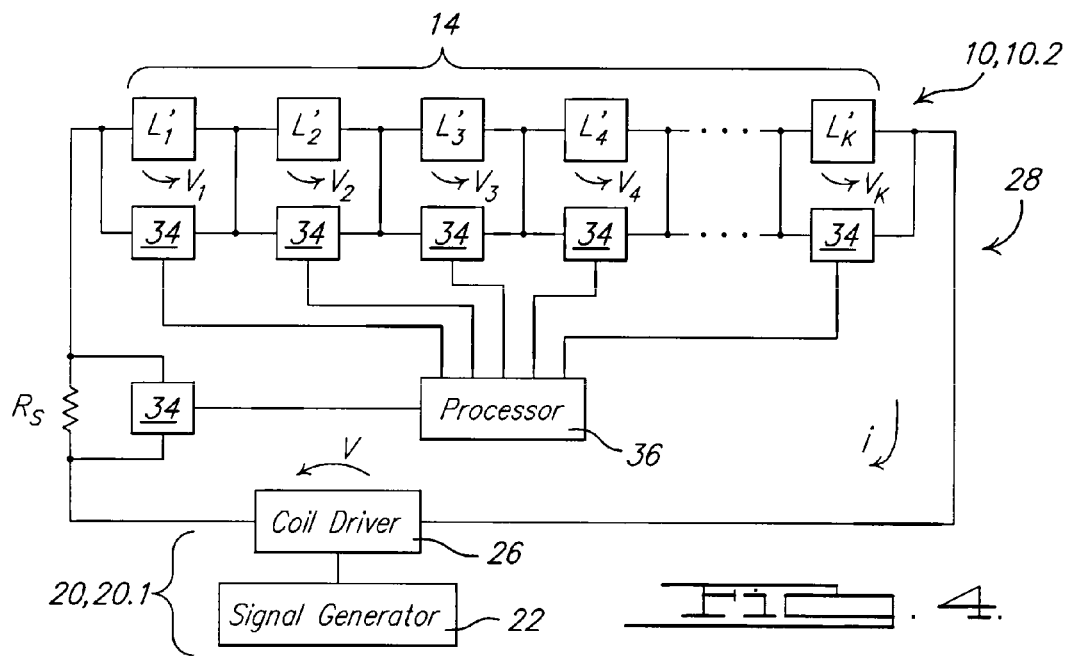
FIG. 4.
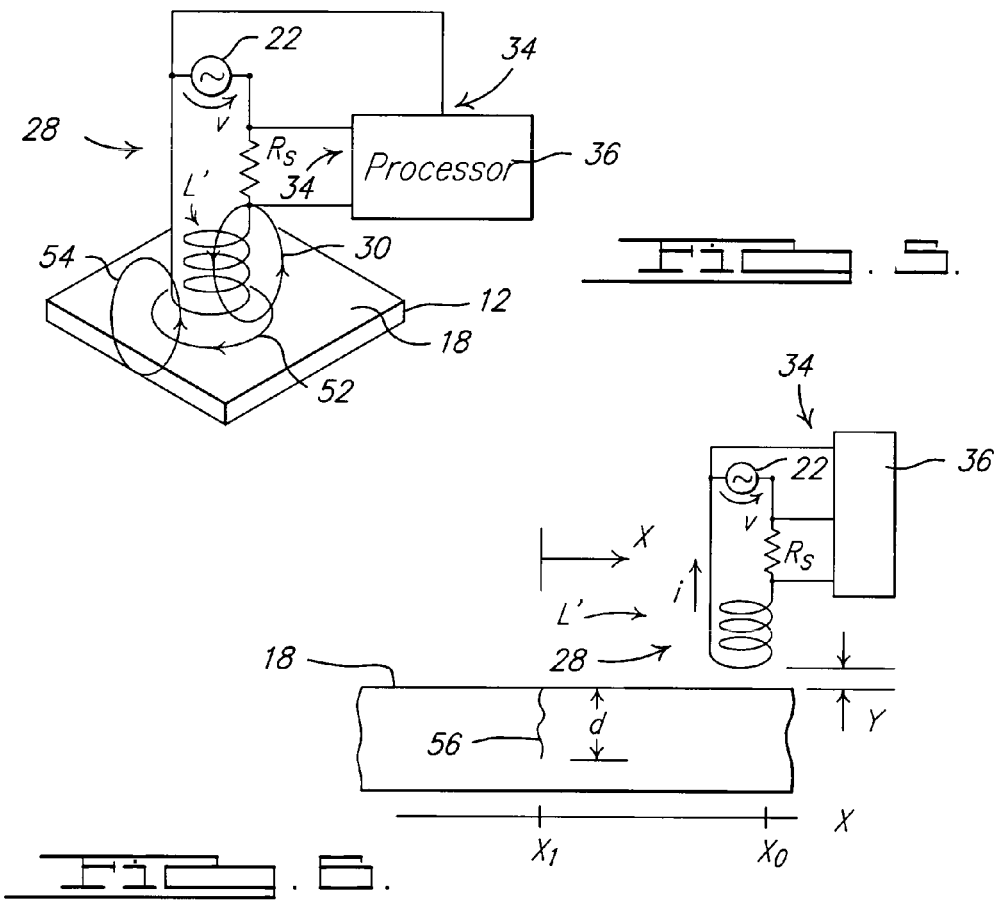
FIG. 5.
FIG. 6.

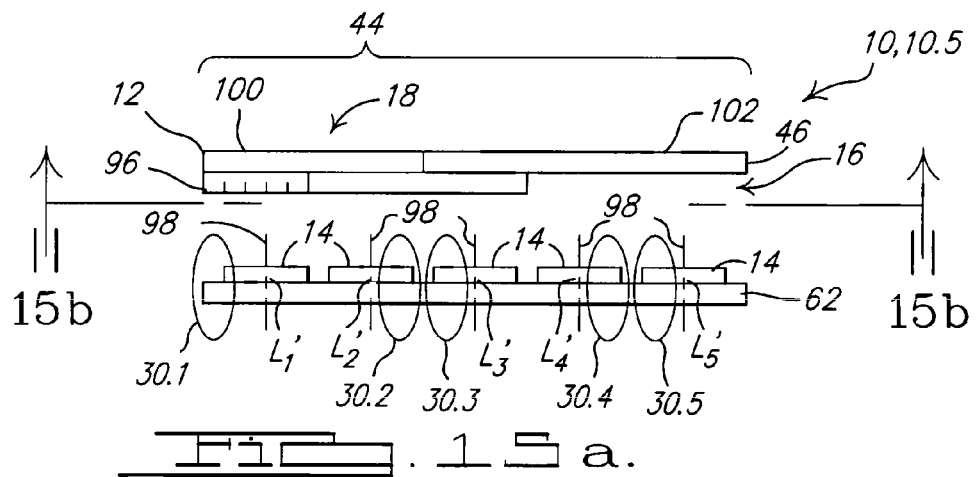
FIG. 15a.
FIG. 15b.
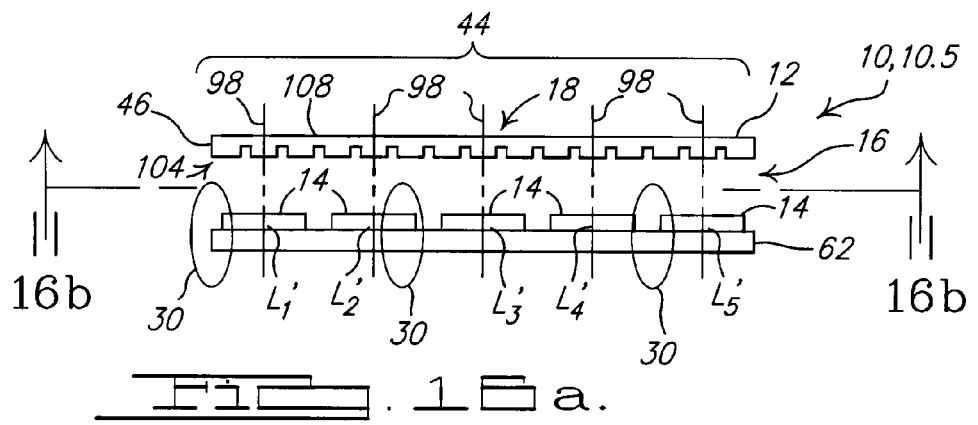
FIG. 16a.
FIG. 16b.

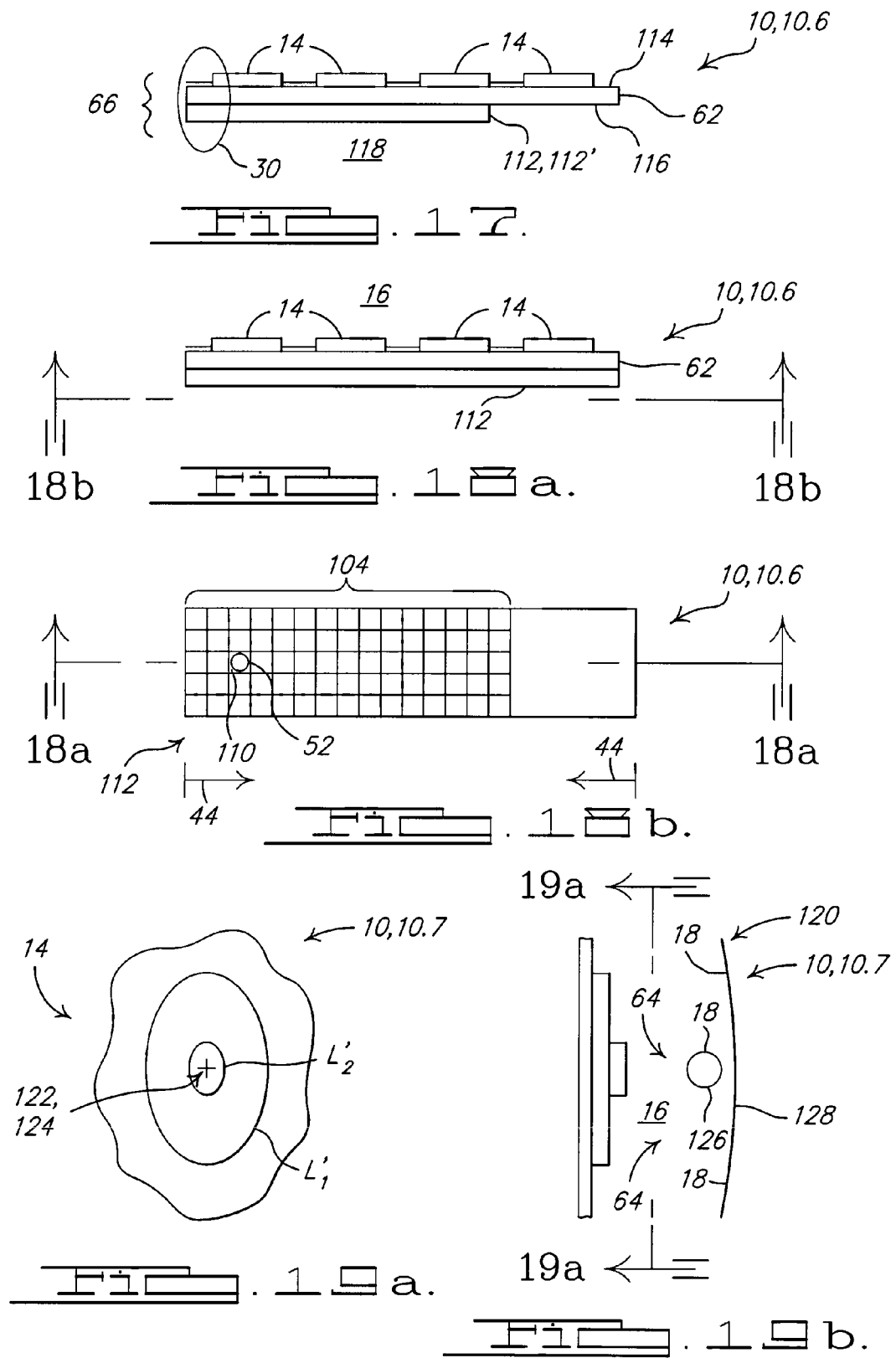

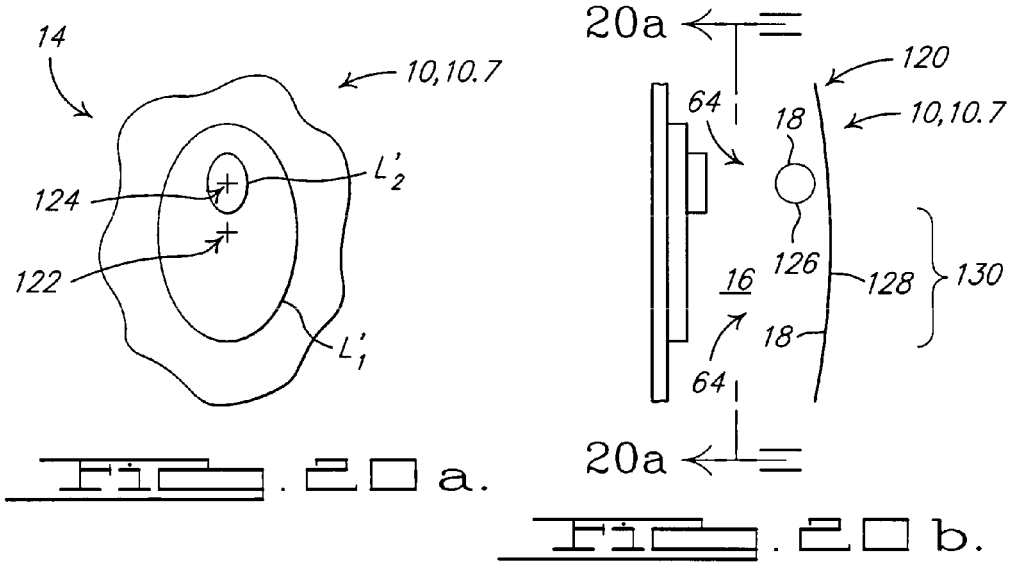
FIG. 20a.
FIG. 20b.
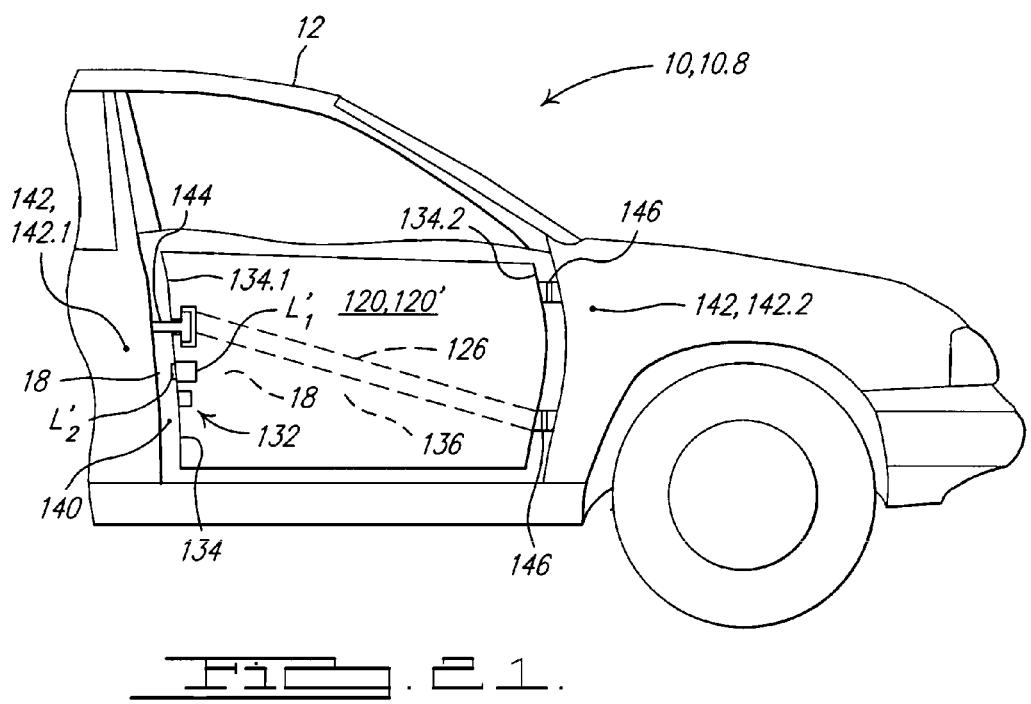
FIG. 21.

MAGNETIC CRASH SENSOR

CROSS-REFERENCE TO RELATED APPLICATIONS

The instant application claims the benefit of prior U.S. Provisional Application Ser. No. 60/595,718 filed on Jul. 29, 2005, which is incorporated herein it its entirety by reference.

BRIEF DESCRIPTION OF THE DRAWINGS

In the accompanying drawings:

FIG. 4 illustrates a schematic block diagram of a second embodiment of the second aspect of the magnetic sensor;

FIG. 5 illustrates the operation of an eddy current sensor;

FIG. 6 illustrates the operation of an eddy current sensor to detect a crack in an object;

FIGS. 15a and 15b illustrate a first embodiment of a fifth aspect of a magnetic sensor;

FIGS. 16a and 16b illustrate a second embodiment of a fifth aspect of a magnetic sensor;

FIG. 17 illustrates a side view of a first embodiment of a sixth aspect of a magnetic sensor;

FIGS. 18a and 18b a second embodiment of the sixth aspect of the magnetic sensor;

FIGS. 19a and 19b illustrate a first embodiment of a seventh aspect of a magnetic sensor;

FIGS. 20a and 20b illustrate a second embodiment of the seventh aspect of the magnetic sensor;

FIG. 21 illustrates an environment of an embodiment of an eighth aspect of the magnetic sensor;

DESCRIPTION OF EMBODIMENT(S)

Figure 1A:
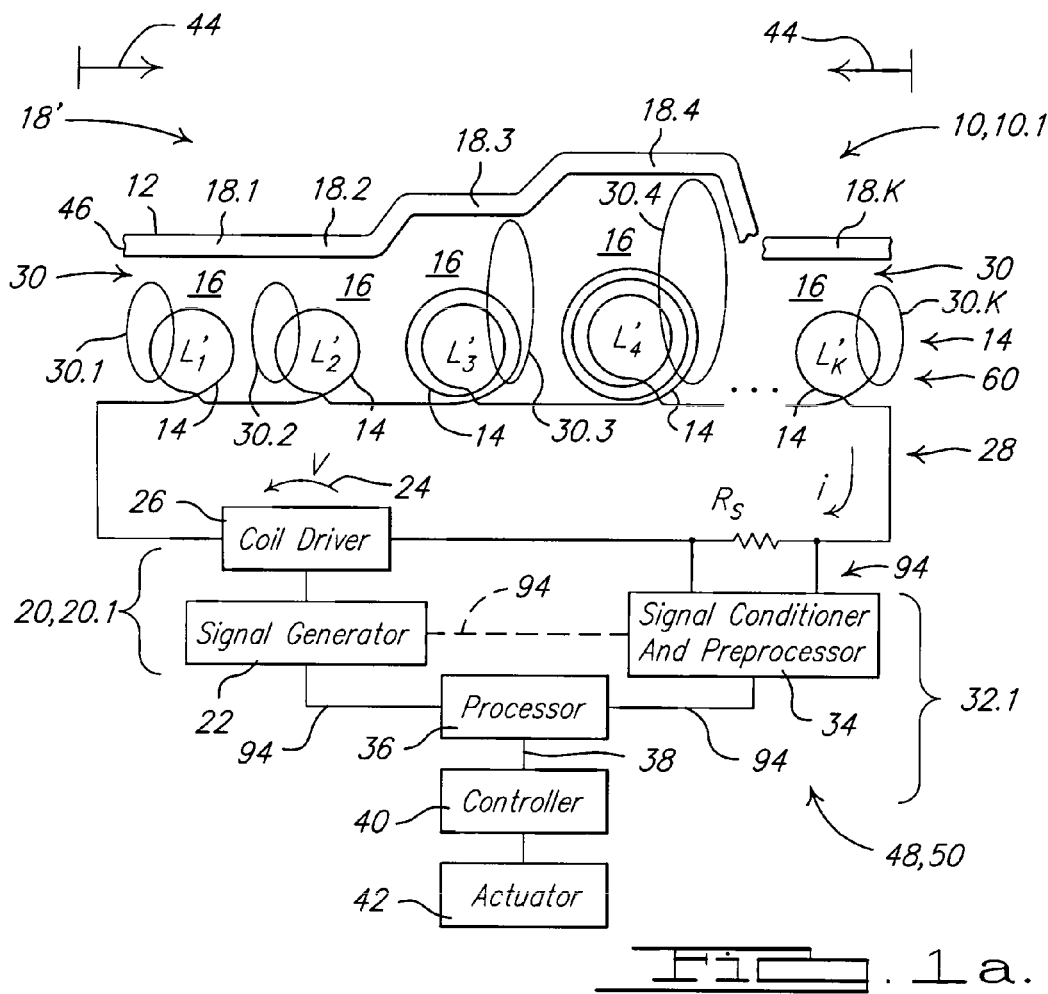
FIG. 1a illustrates a first schematic block diagram of a first embodiment of a first aspect of a magnetic sensor in a vehicle, incorporating a plurality of non-overlapping coil elements.
Figure 1B:
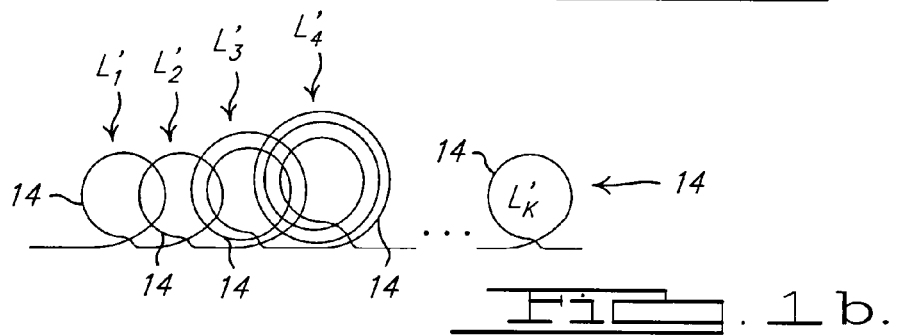
FIG. 1b illustrates a plurality of overlapping coil elements.
Figure 1C:
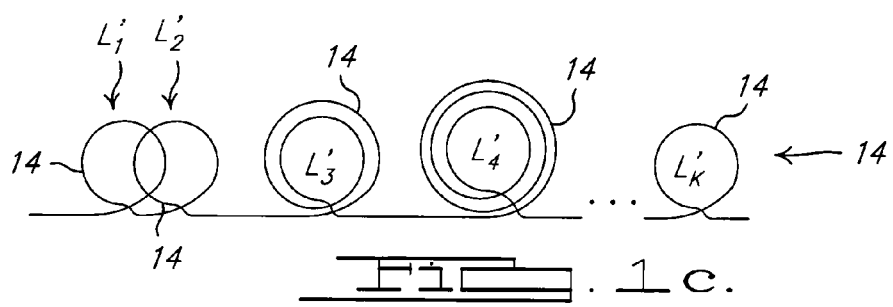
FIG. 1c illustrates a plurality of coil elements, some of which are overlapping, and some of which are non-overlapping.
Figure 2:
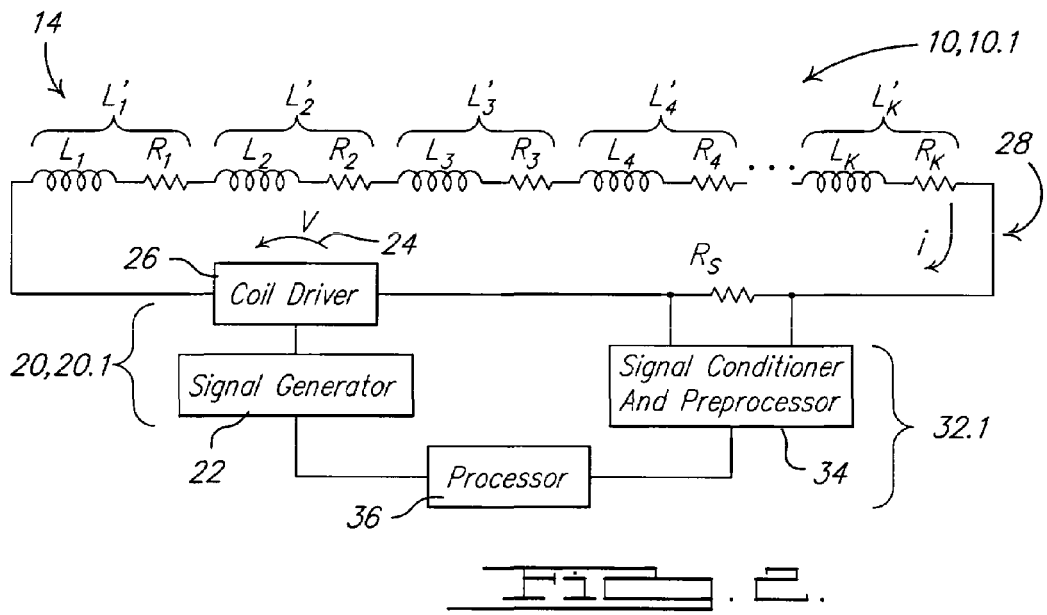
FIG. 2 illustrates a second schematic block diagram of the first embodiment of the first aspect of the magnetic sensor.

Referring to FIGS. 1a, 1b and 2, in accordance with a first embodiment of a first aspect 10.1, a magnetic sensor 10 operatively associated with a vehicle 12 comprises a plurality of coil elements 14 electrically connected in series and distributed across a sensing region 16 adapted so as to cooperate with various associated different portions 18.1, 18.2, 18.3, 18.4 and 18.k of the vehicle 12. The various coil elements 14 can be either non-overlapping as illustrated in FIG. 1a, overlapping as illustrated in FIG. 1b, or, as illustrated in FIG. 1c, some of the coil elements 14 ($L_1'$, $L_2'$) may be overlapping, and other of the coil elements ($L_3'$, $L_4'$, ... $L_K'$) may be non-overlapping. A time-varying signal source 20 comprising a signal generator 22 generates at least one time-varying signal 24 that is operatively coupled to the plurality of coil elements 14, for example, through a coil driver 26. For example, referring to FIG. 2, in accordance with the first embodiment, the plurality of coil elements 14 comprise a plurality of k conductive coil elements $L_1'$, $L_2'$, $L_3'$, $L_4'$, ... $L_K'$, each of which can be modeled as an associated self-inductance $L_1$, $L_2$, $L_3$, $L_4$, ... $L_K$, in series with a corresponding resistance $R_1$, $R_2$, $R_3$, $R_4$, ... $R_K$. The plurality of coil elements 14 are connected in series, a time-varying voltage signal v from a time-varying voltage source 20.1 applied across the plurality of coil elements 14 through a sense resistor $R_S$, which causes a resulting current i to flow through the associated series circuit 28. Each of the associated coil elements $L_1'$, $L_2'$, $L_3'$, $L_4'$, ... $L_K'$ generates an associated magnetic field component 30.1, 30.2, 30.3, 30.4, ... 30.k responsive to the geometry thereof and to the current i therethrough. The associated magnetic field components 30.1, 30.2, 30.3, 30.4, ... 30.k interact with the associated different portions 18.1, 18.2, 18.3, 18.4 and 18.k of the vehicle 12, which affects the effective impedance $Z_1$, $Z_2$, $Z_3$, $Z_4$, ... $Z_K$ of the associated coil elements $L_1'$, $L_2'$, $L_3'$, $L_4'$, ... $L_K'$, thereby affecting the complex magnetic of the associated current i through the associated series circuit 28. A detection circuit 32.1 comprising a signal conditioner and preprocessor circuit 34 senses the current i through each of the plurality of coil elements 14 from an associated voltage drop across the sense resistor $R_S$. The at least one time-varying signal 24, or a signal representative thereof from the signal generator 22, and a signal from the signal conditioner and preprocessor circuit 34 at least representative of the response current i, are operatively coupled to a processor 36 of the detection circuit 32.1 which provides for determining a detected signal 38 comprising a measure responsive to the impedance $Z_1$, $Z_2$, $Z_3$, $Z_4$, ... $Z_K$ of the associated coil elements $L_1'$, $L_2'$, $L_3'$, $L_4'$, ... $L_K'$, responsive to which a controller 40 provides for controlling an actuator 42, either directly or in combination with a second confirmatory signal from a second sensor, e.g. a second crash sensor, or for providing associated information to the driver or occupant of the vehicle 12, or to another system. For example, the actuator 42 may comprise a safety restraint system, e.g. an air bag inflator (e.g. frontal, side, overhead, rear, seat belt or external), a seat belt pretensioning system, a seat control system, or the like, or a combination thereof.

With the plurality of coil elements 14 connected in series, the current i through the series circuit 28, and the resulting detected signal 38, is responsive associated sensed signal components from each of the coil elements $L_1'$, $L_2'$, $L_3'$, $L_4'$, ... $L_K'$, wherein each sensed signal component would correspond to the associated respective impedance $Z_1$, $Z_2$, $Z_3$, $Z_4$, ... $Z_K$ of the respective coil elements $L_1'$, $L_2'$, $L_3'$, $L_4'$, ... $L_K'$, wherein the associated respective impedances $Z_1$, $Z_2$, $Z_3$, $Z_4$, ... $Z_K$ of the associated coil elements $L_1'$, $L_2'$, $L_3'$, $L_4', \ldots L_K'$ are responsive to the associated respective magnetic field components $30.1, 30.2, 30.3, 30.4, \ldots 30.k$ responsive to the associated interactions of the respective coil elements $L_1', L_2', L_3', L_4', \ldots L_K'$ with the respective different portions $18.1, 18.2, 18.3, 18.4$ and $18.k$ of the vehicle 12. Accordingly, the detected signal 38 provides for detecting a change in a magnetic condition of, or associated with, the vehicle 12, for example, as might result from either a crash or a proximate interaction with another vehicle. The plurality of coil elements are adapted to span a substantial region 44 of a body or structural element 46 of the vehicle 12, wherein the body or structural element 46 of the vehicle 12 is susceptible to deformation responsive to a crash, or is susceptible to some other interaction with another vehicle that is to be detected. Accordingly, a detected signal 38 responsive to the current i through the plurality of coil elements 14 distributed over a substantial region 44 of a body or structural element 46 of the vehicle 12, in a series circuit 28 driven by a time-varying voltage signal v across the series combination of the plurality of coil elements 14, provides for detecting from a single detected signal 38 a change in a magnetic condition of, or associated with, the vehicle 12 over the associated substantial region 44 of the body or structural element 46 of the vehicle 12, so as to provide for a magnetic sensor 10 with relatively broad coverage.

Figure 3:
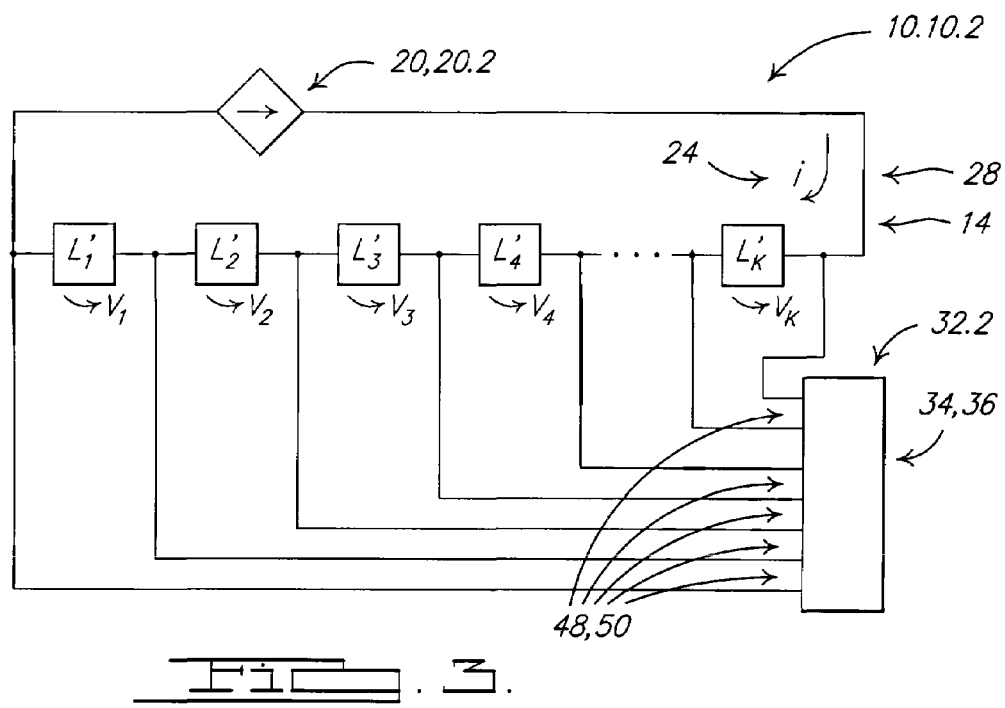
FIG. 3 illustrates a schematic block diagram of a first embodiment of a second aspect of a magnetic sensor.

In accordance with a second aspect 10.2 of the magnetic sensor 10, a plurality of response signals are measured each responsive to different coil elements $L_1', L_2', L_3', L_4', \ldots L_K'$ of subsets thereof. Referring to FIG. 3, in accordance with a first embodiment of the second aspect 10.2 of the magnetic sensor 10, the time-varying signal source 20 comprises a time-varying current source 20.2, and the associated detection circuit 32.2 is responsive to at least one voltage signal $v_1$, $v_2$, $v_3$, $v_4$, ... $v_K$ across at least one of the corresponding coil elements $L_1', L_2', L_3', L_4', \ldots L_K'$. For example, in the first embodiment illustrated in FIG. 3, each of the voltage signals $v_1, v_2, v_3, v_4, \ldots v_K$ across each of the corresponding coil elements $L_1', L_2', L_3', L_4', \ldots L_K'$ is measured by the detection circuit 32.2, for example, by an associated processor 36 incorporating associated signal conditioner and preprocessor circuits 34, e.g. corresponding differential amplifiers 48 and A/D converters 50 operatively coupled across each of the coil elements $L_1', L_2', L_3', L_4', \ldots L_K'$, so as to provide for generating at least one detected signal 38 responsive to the impedance $Z_1, Z_2, Z_3, Z_4, \ldots Z_K$ of the associated respective coil elements $L_1', L_2', L_3', L_4', \ldots L_K'$.

Referring to FIG. 4, in accordance with a second embodiment of the second aspect 10.2 of the magnetic sensor 10, the plurality of coil elements 14 connected in a series circuit 28 are driven by a time-varying voltage source 20.1 comprising a signal generator 22 operatively coupled to a coil driver 26. The current i through the series circuit 28 is measured by the processor 36 from the voltage drop across a sense resistor $R_S$ in the series circuit 28, conditioned by an associated signal conditioner and preprocessor circuit 34 operatively coupled to the processor 36. Each of the voltage signals $v_1, v_2, v_3, v_4, \ldots v_K$ across each of the coil elements $L_1', L_2', L_3', L_4', \ldots L_K'$ are also measured by the processor 36 using associated signal conditioner and preprocessor circuits 34 operatively coupled therebetween, so as to provide for measuring—i.e. at least generating a measure responsive to—the corresponding impedances $Z_1, Z_2, Z_3, Z_4, \ldots Z_K$ of each of the corresponding respective coil elements $L_1', L_2', L_3', L_4', \ldots L_K'$, so as to provide for generating a measure responsive to the localized magnetic conditions of, or associated with, the vehicle 12 over the associated substantial region 44 of the body or structural element 46 of the vehicle 12 associated with the different portions $18.1, 18.2, 18.3, 18.4$ and $18.k$ of the vehicle 12 associated with the corresponding respective coil elements $L_1', L_2', L_3', L_4', \ldots L_K'$.

The at least one time-varying signal 24 from the time-varying signal source 20 may comprise either an oscillatory or pulsed waveform. For example, the oscillatory waveform may comprise a sinusoidal waveform, a triangular ramped waveform, a triangular sawtooth waveform, a square waveform, or a combination thereof, at a single frequency or a plurality of different frequencies; and the pulsed waveform may comprise any of various pulse shapes, including, but not limited to, a ramp, a sawtooth, an impulse or a rectangle, at a single pulsewidth or a plurality of different pulsewidths. Frequency diversity techniques can provide information about deformation depth or deformation rate of the associated different portions $18.1, 18.2, 18.3, 18.4$ and $18.k$ of the vehicle 12 being sensed, and can also provide for improve electromagnetic compatibility and immunity to external electromagnetic noise and disturbances.

Referring to FIG. 5, a particular coil element L' is driven by an oscillatory time-varying voltage signal v operatively coupled thereto through an associated sense resistor $R_S$. The oscillatory time-varying voltage signal v generates an associated oscillatory current i in the associated series circuit 28 which generates an associated magnetic field component 30 that interacts with an associated portion 18 of the vehicle 12. If the associated portion 18 of the vehicle 12 is conductive, then the associated magnetic field component 30 interacting therewith will generate associated eddy currents 52 therein in accordance with Faraday's Law of induction. The direction of the associated eddy currents 52 is such that the resulting associated eddy-current-induced magnetic field component 54 opposes the associated magnetic field component 30 generated by the current i in the coil element L'. If the associated portion 18 of the vehicle 12 is not perfectly conductive, then the eddy currents 52 will heat the associated conductive material resulting in an associated power loss, which affects the relative phase of the eddy-current-induced magnetic field component 54 relative to the phase of the oscillatory time-varying voltage signal v. Furthermore, a ferromagnetic associated portion 18 of the vehicle 12 interacting with the associated magnetic field component 30 can affect the self-inductance L of the associated coil element L'.

Figure 7:
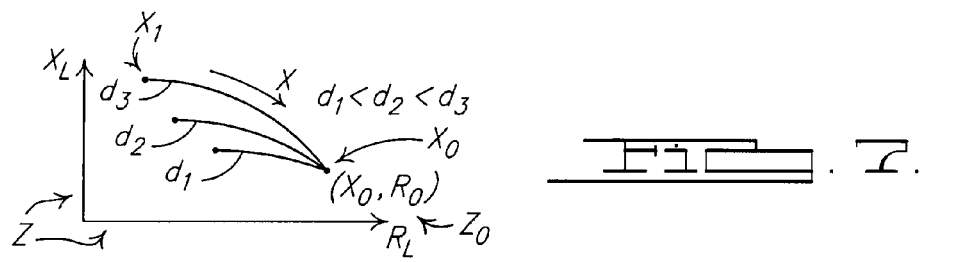
FIG. 7 illustrates a complex impedance detected using the eddy current sensor illustrated in FIG. 6 responsive to cracks of various depths.

Referring to FIGS. 6 and 7, the impedance Z of the coil element L' is illustrated as a function of the transverse position x of the coil element L' relative to a crack 56 extending into in a conductive portion 18 of the vehicle 12, for various crack depths d, with the coil element L' at a constant distance y from the conductive portion 18 of the vehicle 12, wherein the distance y is the length of the gap between the coil element L' and the surface of the conductive portion 18 of the vehicle 12. In FIG. 7, the inductive reactance $X_L$ and resistance $R_L$ components of impedance Z of the coil element L' are plotted in the complex plane as a function of transverse position x for families of crack depth d, wherein the resistance $R_L$ of the coil elements L' is responsive to a component of the current i that is in-phase with respect to the associated time-varying voltage signal v, and the inductive reactance $X_L$ of the coil element L' is responsive to a component of the current i that is in quadrature-phase with respect to the associated time-varying voltage signal v. Relative to the nominal impedance $Z_0=(X_0, R_0)$ of the coil element L', corresponding to a negligible perturbation from the crack 56, the effective inductive reactance $X_L$ of the coil element L' increases, and the effective resistance $R_L$ decreases, with increasing crack depth d and with increasing proximity to the crack 56 (i.e. decreasing traverse (x) distance with respect to the crack 56). The eddycurrent-induced magnetic field component 54 opposing the magnetic field component 30 responsive to the current i therein causes the nominal decrease in the effective impedance Z of the coil element L' relative to free-space conditions, and the crack 56 disrupts the eddy currents 52 in the conductive portion 18 of the vehicle 12 causing a resulting increase in effective impedance Z. Similarly, the effective impedance Z of the coil element L' is a function of the distance y from, and the magnetic and conductive properties of, the conductive portion 18 of the vehicle 12. The plurality of coil elements 14 of the magnetic sensor 10 provide for substantially simultaneously generating a plurality of measures responsive to the impedance Z of each associated coil element L', which provides for detecting an associated change in the magnetic condition of the vehicle 12 over the associated sensing region 16 spanned by the plurality of coil elements 14, which is responsive to changes in the gap distance y to the associated proximate portion 18 of the vehicle 12, and responsive to changes in the magnetic and conductive properties thereof.

Figure 8:
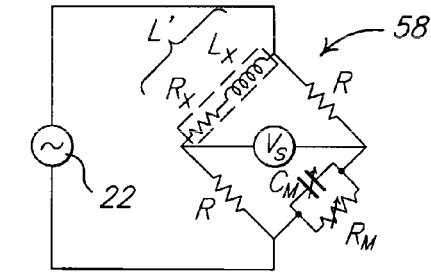
FIG. 8 illustrates a Maxwell-Wien bridge for measuring complex impedance.

The detection circuit 32 provides for detecting the impedance Z of at least one of the plurality of coil elements 14, or of a combination or combinations thereof. For example, referring to FIG. 8, a Maxwell-Wien bridge 58 may be used to measure the inductive reactance $X_L$ and resistance $R_L$ components of impedance Z of a coil elements L' or a combination of coil elements $L_1'$, $L_2'$, $L_3'$, $L_4'$, ... $L_K'$. Alternatively, the signal conditioner and preprocessor circuit 34, provides for measuring at least one signal across a plurality of coil elements $L_1'$, $L_2'$, $L_3'$, $L_4'$, ... $L_K'$ and provides for measuring the signal applied thereto by the associated coil driver 26. The signal conditioner and preprocessor circuit 34—alone, or in combination with the processor 36, provides for decomposing the signal from a plurality of coil elements $L_1'$, $L_2'$, $L_3'$, $L_4'$, ... $L_K'$ into real and imaginary components, for example, using the signal applied by the associated coil driver 26 as a phase reference.

The decomposition of a signal into corresponding real and imaginary components is well known in the art, and may be accomplished using analog circuitry, digital circuitry or by software or a combination thereof. For example, U.S. Pat. Nos. 4,630,229, 6,005,392 and 6,288,536—all of which is incorporated by reference herein in their entirety—each disclose various systems and methods for calculating in real-time the real and imaginary components of a signal which can be used for processing the signal from the at least one coil element $L_1'$, $L_2'$, $L_3'$, $L_4'$, ... $L_K'$. A Maxwell-Wien bridge 58, e.g. incorporated in the signal conditioner and preprocessor circuit 34, may also be used to determine the real and imaginary components of a signal, or a phase-locked loop may be used to determine the relative phase of a signal with respect to a corresponding signal source, which then provides for determining the associated real and imaginary components. Various techniques known from the field eddy current inspection can also be used for processing the signal from the at least one coil element $L_1'$, $L_2'$, $L_3'$, $L_4'$, ... $L_K'$, for example, as disclosed in the Internet web pages at http://www.ndt-ed.org/EducationResources/CommunityCollege/EddyCurrents/cc_ec_index.htm, which are incorporated herein by reference. The magnetic sensor 10 can employ various signal processing methods to improve performance, for example, multiple frequency, frequency hopping, spread spectrum, amplitude demodulation, phase demodulation, frequency demodulation, etc. Various methods are available to discriminate small changes in impedance.

Figure 9:
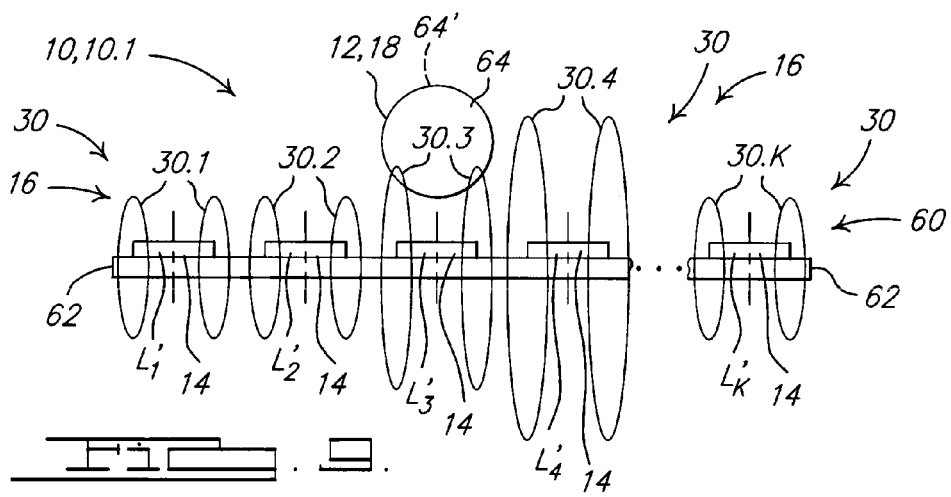
FIG. 9 illustrates a side view of the first embodiment of the first aspect of the magnetic sensor illustrating the operation thereof.

Referring to FIG. 9, in accordance with the first embodiment of the first aspect 10.1 of the magnetic sensor 10, a plurality of plurality of coil elements 14 electrically in series with one another constituting a distributed coil 60 operatively associated with, or mounted on, an associated substrate 62 are illustrated operating in proximity to a magnetic-field-influencing object 64—e.g. either ferromagnetic, conductive, or a combination thereof—constituting either a portion 18 of a vehicle 12, or at least a portion of an object 64' distinct the vehicle 12, e.g. a portion of another vehicle. Referring also to FIG. 1, different coil elements $L_1'$, $L_2'$, $L_3'$, $L_4'$, ... $L_K'$ are adapted with different geometries, e.g. different associated numbers of turns or different sizes, so as to provide for shaping the associated magnetic field components 30.1, 30.2, 30.3, 30.4, ... 30.k, so as to in shape the overall magnetic field 30 spanning the sensing region 16, for example, so that the associated magnetic field components 30.1, 30.2, 30.3, 30.4, ... 30.k are stronger—e.g. by using a greater number of turns for the associated coil elements $L_1'$, $L_2'$, $L_3'$, $L_4'$, ... $L_K'$—proximate to different portions 18.1, 18.2, 18.3, 18.4 and 18.k that are nominally less magnetically influential on the associated impedances $Z_1$, $Z_2$, $Z_3$, $Z_4$, ... $Z_K$ of the associated different coil elements $L_1'$, $L_2'$, $L_3'$, $L_4'$, ... $L_K'$, than other coil elements $L_1'$, $L_2'$, $L_3'$, $L_4'$, ... $L_K'$. For example in the first embodiment illustrated in FIG. 1, coil elements $L_1'$, $L_2'$ and $L_K'$ are illustrated each comprising one turn, coil element $L_3'$ is illustrated comprising two turns, and coil element $L_4'$ is illustrated comprising three turns, wherein the number of turns is inversely related to the relative proximity of the associated corresponding different portions 18.1, 18.2, 18.3, 18.4 and 18.k of the vehicle 12 to the corresponding coil elements $L_1'$, $L_2'$, $L_3'$, $L_4'$, ... $L_K'$, respectively. Accordingly, the plurality of coil elements 14 are adapted so as to provide for shaping the associated magnetic field 30 responsive to at least one magnetic-field influencing property of at least one portion 18 of the vehicle 12 in proximity to the plurality of coil elements 14. The shaping of the composite distributed magnetic field 30 provides for normalizing the affect of a change in the associated magnetic condition of the associated magnetic-field-influencing object 64 being sensed over the length or area of the associated sensing region 16, and also provides for increasing the sensitivity of the magnetic sensor 10 in locations where necessary, and/or decreasing the sensitivity of the magnetic sensor 10 in other locations where necessary.

Figure 10A:
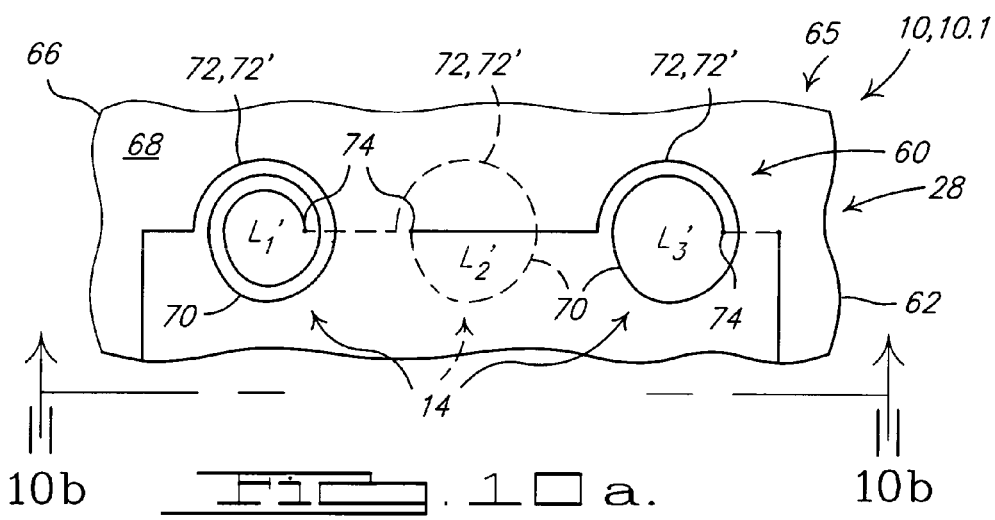
FIGS. 10a and 10b illustrate a first physical embodiment of the first aspect of the magnetic sensor.
Figure 10B:
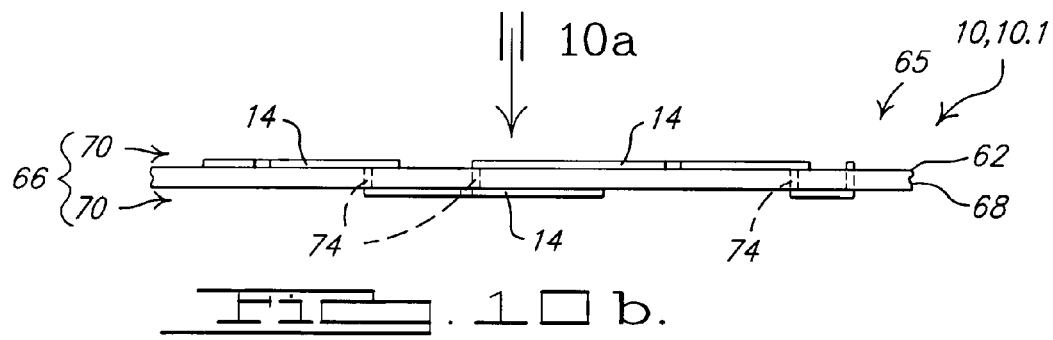

Referring to FIGS. 10a and 10b, in accordance with a first physical embodiment 65 of the first aspect 10.1 of the magnetic sensor 10, a distributed coil 60 comprises a plurality of coil elements 14 formed with a printed circuit board 66 comprising a dielectric substrate 68 with a plurality of conductive layers 70 on opposing surfaces thereof, wherein each conductive layer 70 is adapted with associated planar conductive patterns 72, e.g. planar spiral conductive patterns 72', defining the associated coil elements $L_1'$, $L_2'$, $L_3'$. For example, the planar conductive patterns 72 on an associated dielectric substrate 68 may be formed by subtractive technology, for example, chemical or ion etching, or stamping; or additive techniques, for example, deposition, bonding or lamination. Adjacent coil elements $L_1'$, $L_2'$, $L_3'$ are located on opposite sides of the dielectric substrate 68, and are interconnected with one another with associated conductive vias 74 extending through the dielectric substrate 68. Notwithstanding the different associated coil elements $L_1'$, $L_2'$, $L_3'$ illustrated in FIG. 10a each have the same coil pitch sense, i.e. the same spiral winding sense so that each associated coil element $L_1'$, $L_2'$, $L_3'$ has the same polarity, it should be understood that the distributed coil 60 could be adapted with different coil elements $L_1'$, $L_2'$, $L_3'$ having different associated coil pitch senses.

Figure 11:
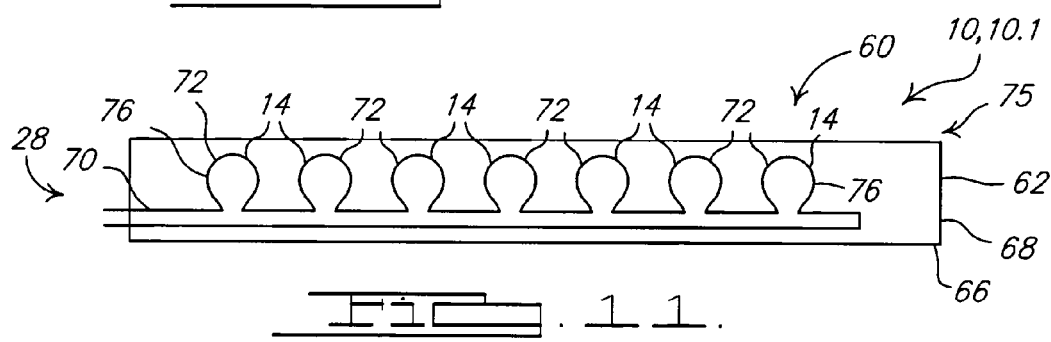
FIG. 11 illustrates a second physical embodiment of the first aspect of the magnetic sensor.

Referring to FIG. 11, in accordance with a second physical embodiment 75 of the first aspect 10.1 of the magnetic sensor 10, a distributed coil 60 comprises a plurality of coil elements 14 formed with a printed circuit board 66 comprising a dielectric substrate 68 with a conductive layer 70 on a surface thereof, wherein the conductive layer 70 is adapted with associated planar conductive patterns 72 defining an associated plurality of plurality of coil elements 14, each of which comprises substantially one turn with non-overlapping conductors 76.

Alternatively, the distributed coil 60 may comprise a plurality of coil elements 14, each comprising a winding of a conductor 76, e.g. magnet wire, wound so as to form either a planar or non-planar coil, and bonded to the surface of a substrate 62, wherein the associated coil elements 14 may be either separated from, or overlapping, one another, and the associated windings of a particular coil element 14 may be either overlapping or non-overlapping. The different coil elements 14 may be formed from a single contiguous conductor, or a plurality of conductive elements joined or operative together. The associated distributed coil 60 may comprise multiple layers either spanning across different sides of the substrate 62 or on a same side of the substrate 62. If the conductor 76 so formed were insulated, e.g. as would be magnet wire, then the substrate 62 could comprise substantially any material that would provide for the associated generation of the associated magnetic field 30 by the plurality of coil elements 14. Furthermore, the substrate 62 could comprise either a rigid material, e.g. a thermoset plastic material, e.g. a glass-epoxy composite material or a phenolic material; or a flexible material, e.g. a plastic or composite membrane.

The distributed coil 60 in accordance with any of the above-described embodiments may be encapsulated so as to provide for improved reliability and reduced susceptibility to environmental affects. Furthermore, the distributed coil 60 may be combined with some or all of the associated circuitry, e.g. the time-varying signal source 20 and associated detection circuit 32, or components thereof, in an associated magnetic sensor module, some or all of which may be encapsulated so as to provide for improved reliability and reduced susceptibility to environmental affects. Alternatively, the distributed coil 60 and associated detection circuit 32 may be packaged separately.

Figure 12:
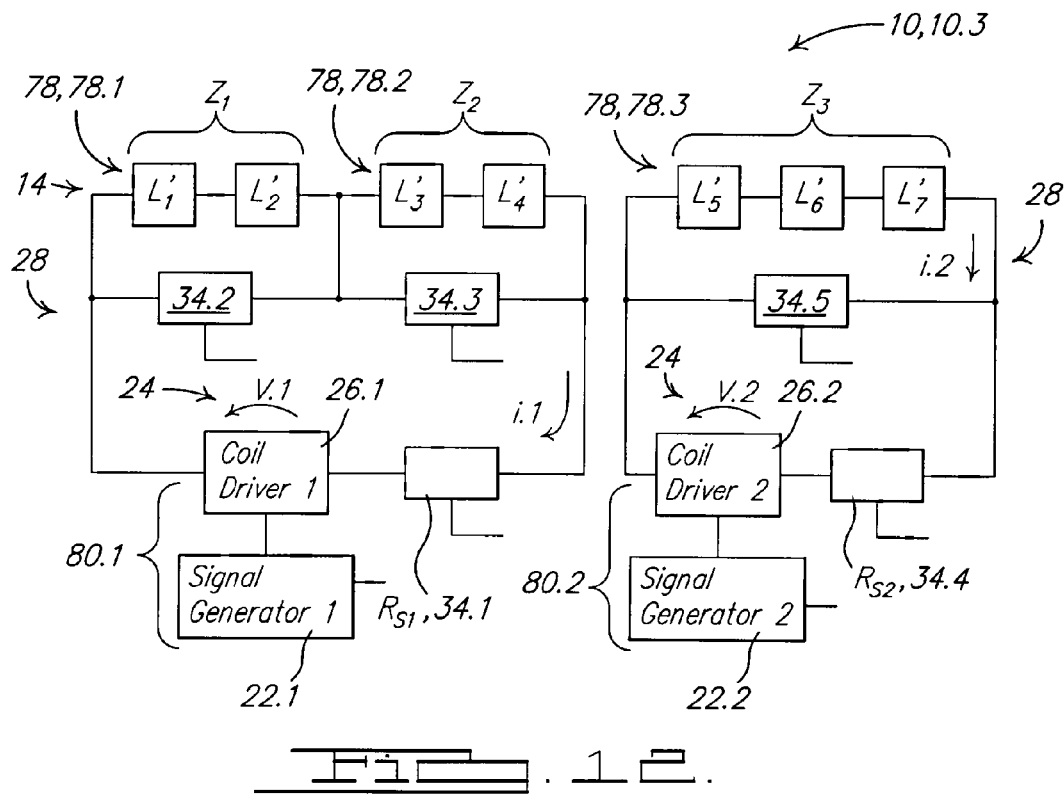
FIG. 12 illustrates a schematic block diagram of a first embodiment of a third aspect of a magnetic sensor.

Referring to FIG. 12, in accordance with a third aspect 10.3 of the magnetic sensor 10, the plurality of coil elements 14 are grouped into a plurality of subsets 78, for example, in a first embodiment, first 78.1, second 78.2 and third 78.3 subsets of coil elements 14, wherein the coil elements 14 in each subset 78 are connected in series, a series combination of the first 78.1 and second 78.2 subsets of coil elements 14 are driven by a first time-varying signal source 80.1, i.e. a first time-varying voltage source 80.1, comprising a first coil driver 26.1 driven by a first signal generator 22.1 and the third subset 78.3 of coil elements 14—electrically separated from the first 78.1 and second 78.2 subsets—is driven by a second time-varying signal source 80.2, i.e. a second time-varying voltage source 80.2, comprising a second coil driver 26.2 driven by a second signal generator 22.2. A first time-varying voltage signal v.1 from the first time-varying voltage source 80.1 generates a first current i.1 in the series combination of the first 78.1 and second 78.2 subsets of coil elements 14, which is sensed by a first signal conditioner and preprocessor circuit 34.1 responsive to the associated voltage drop across a first sense resistor $R_{S1}$. The first subset 78.1 of coil elements 14 comprises a series combination of two coil elements $L_1'$ and $L_2'$, across which a second signal conditioner and preprocessor circuit 34.2 provides for measuring a voltage drop thereacross, which together with the first current i.1, provides for an associated processor 36 to generate a measure of the impedance $Z_1$ of the first subset 78.1 of coil elements 14. Similarly, the second subset 78.2 of coil elements 14 comprises a series combination of two coil elements $L_3'$ and $L_4'$, across which a third signal conditioner and preprocessor circuit 34.3 provides for measuring a voltage drop thereacross, which together with the first current i.1, provide for the associated processor 36 to generate a measure of the impedance $Z_2$ of the second subset 78.2 of coil elements 14. A second time-varying voltage signal v.2 from the second time-varying voltage source 80.2 generates a second current i.2 in the third subset 78.3 of coil elements 14, which is sensed by a fourth signal conditioner and preprocessor circuit 34.4 responsive to the associated voltage drop across a second sense resistor $R_{S2}$. The third subset 78.3 of coil elements 14 comprises a series combination of three coil elements $L_5'$, $L_6'$ and $L_7'$, across which a fifth signal conditioner and preprocessor circuit 34.5 provides for measuring a voltage drop thereacross, which together with the second current i.2, provides for an associated processor 36 to generate a measure of the impedance $Z_3$ of the third subset 78.3 of coil elements 14. Accordingly, the third aspect 10.3 of the magnetic sensor 10 provides for applying different time-varying signals 24 to different subsets 78 of coil elements 14, wherein the different time-varying signals 24 may comprise different magnitudes, waveforms, frequencies or pulsewidths, etc. The third aspect 10.3 of the magnetic sensor 10 also provides for measuring a plurality of impedances Z of a plurality of different subsets 78 of coil elements 14, so as to provide for localized measures of the associated magnetic condition of the vehicle 12. The associated voltage measurements associated with the corresponding impedance measurements can be either simultaneous or multiplexed. Furthermore, the magnetic sensor 10 may be adapted so as to provide for measurements of both individual subsets 78 of coil elements 14 and of the overall series combination of a plurality of subsets 78 of coil elements 14, wherein the particular measurements may be chosen so as to provide localized measurements of some portions 18 of the vehicle 12 in combination with an overall measurement to accommodate the remaining portions 18, so as to possibly provide for a spatial localization of perturbations to the magnetic condition of the vehicle 12, or the rate of deformation or propagation of a magnetic disturbance, for example, as may result from a crash or proximity of another vehicle. It should be understood that a variety of measures may be used by the associated detection circuit 32, for example, impedance Z, a voltage signal from the associated signal conditioner and preprocessor circuit 34, or in-phase and/or quadrature-phase components of the voltage signal from the associated signal conditioner and preprocessor circuit 34. For example, a comparison of the ratio of a voltage from a subset 78 of coil elements 14 to the voltage across the entire associated distributed coil 60 can provide for mitigating the affects of noise and electromagnetic susceptibility.

Figure 13:
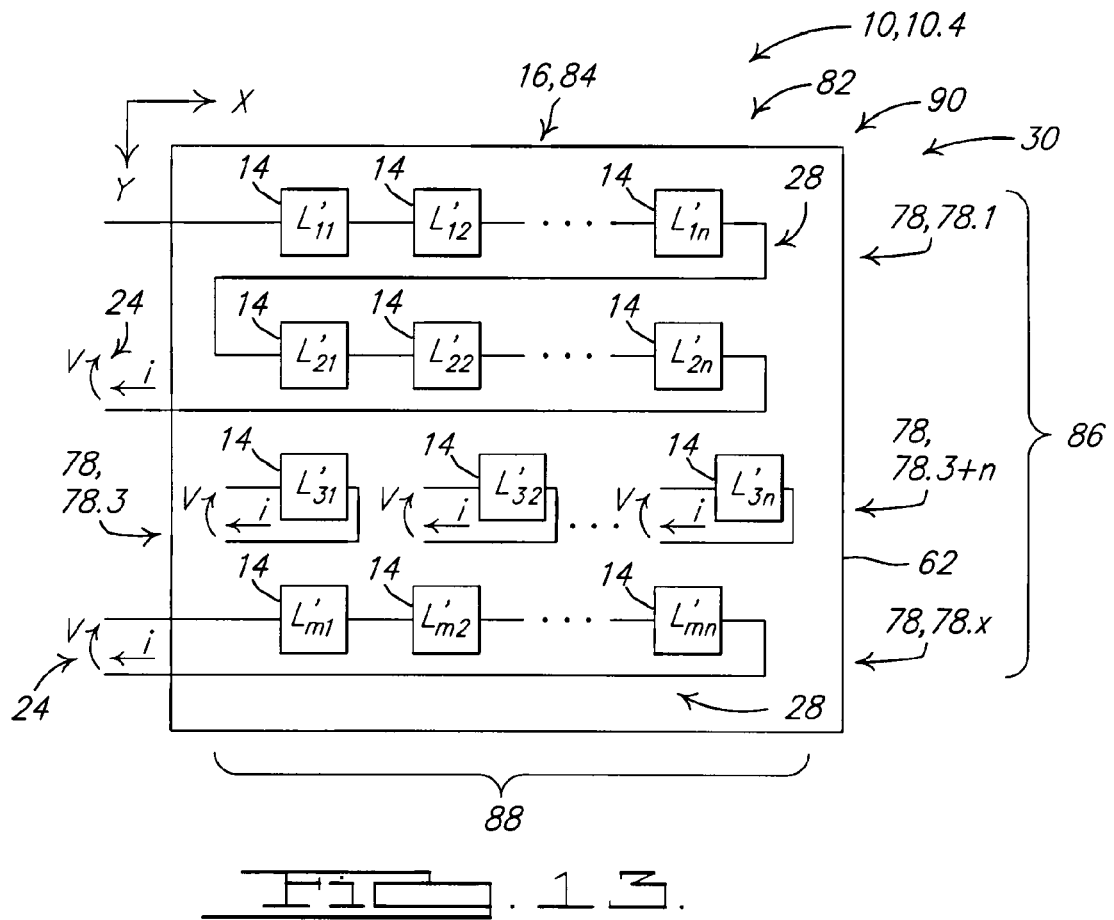
FIG. 13 illustrates a schematic block diagram of a first embodiment of a fourth aspect of a magnetic sensor.

Referring to FIG. 13, in accordance with a first embodiment of a fourth aspect 10.4 of a magnetic sensor 10, the plurality of coil elements 14 are arranged in a two-dimensional array 82 on a substrate 62 so as to provide for sensing a change in a magnetic condition of the vehicle 12 over an associated two-dimensional sensing region 84. For example, in accordance with a first embodiment, the two-dimensional array 82 comprises m rows 86 and n columns 88 of associated coil elements 14, wherein different columns 88 are at different X locations, and different rows 86 are at different Y locations of a Cartesian X-Y coordinate system. In the first embodiment, the m×n two-dimensional array 82 is organized in a plurality of subsets 78, for example, a first subset 78.1 comprising rows 86 numbered 1 and 2 of the two-dimensional array 82, the next n subsets 78.3-78.3+n respectively comprising the individual coil elements 14 of the third row 86, and the last subset 78.x comprising the last ($m^{th}$) row of the two-dimensional array 82. Each subset 78 comprises either a single coil element 14 or a plurality of coil elements 14 connected in series, and provides for a relatively localized detection of the magnetic condition of the vehicle 12 responsive to the detection of an associated measure responsive to the impedance Z of the associated subset 78 of coil elements 14, using a detection circuit 32, for example, similar to that described hereinabove in accordance with other embodiments or aspects of the magnetic sensor 10. It should be understood that the plurality of coil elements 14 in accordance with the fourth aspect 10.4 of a magnetic sensor 10 need not necessarily be arranged in a Cartesian two-dimensional array 82, but alternatively, could be arranged in accordance with some other pattern spanning a two-dimensional space, and furthermore, could also be arranged so in accordance with a pattern spanning a three-dimensional space, for example, by locating at least some coil elements 14 at different distances from an underlying reference surface. The geometry—e.g. shape, size, number of turns, or conductor size or properties—of a particular coil element 14 and the associated substrate 62 if present can be adapted to provide for shaping the overall magnetic field 30 spanning the sensing region 16. For example, the coil elements 14 can be formed on or constructed from a flexible printed circuit board (PCB) or other flexible or rigid flat mounting structure, and, for example, the resulting assembly 90 of coil elements 14 may be encapsulated for environmental protection or to maintain the necessary shape and/or size for proper operability thereof in cooperation with the vehicle 12. Different subsets 78 of coil elements 14 may be driven with different time-varying signals 24, for example, each with an associated waveform or pulse shape, frequency, frequency band or pulse width, and amplitude adapted to the particular subset 78 of coil elements 14 so as to provide for properly discriminating associated crash events or proximate objects as necessary for a particular application.

Figure 14:
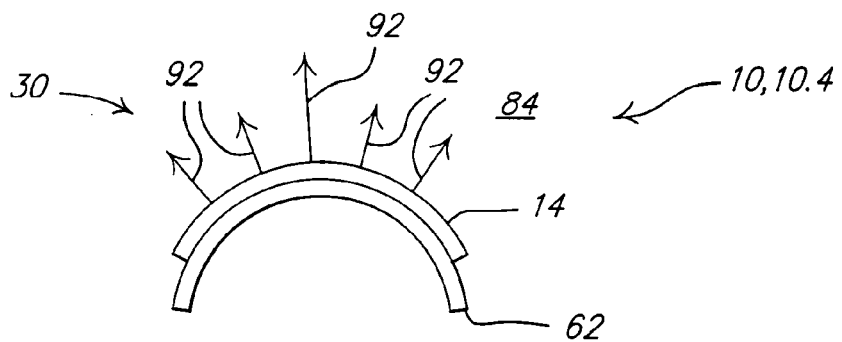
FIG. 14 illustrates an end view of a second embodiment of the fourth aspect of a magnetic sensor.

Referring to FIG. 14, in accordance with a second embodiment of the fourth aspect 10.4 of a magnetic sensor 10, the substrate 62 is shaped, e.g. curved, so that different coil elements 14 are aligned in different directions 92, so as to provide for different magnetic field components 30 being oriented in different directions as necessary to provide for sensing a particular portion 18 of a vehicle 12.

The magnetic sensor 10 provides for detecting deformation and/or displacement of associated at least one magnetic-field-influencing object 64 constituting portions 18 of the vehicle 12 responsive to a crash, and/or provides for detecting the proximity or approach of an approaching or proximate external magnetic-field-influencing object 64, within the sensing range of at least one coil elements 14 of the plurality of coil elements 14 distributed across either one-, two- or three-dimensional space. The plurality of coil elements 14 driven by at least one time-varying signal 24 exhibit a characteristic complex impedance Z which is affected and changed by the influence of a proximate magnetic-field-influencing object 64 and/or deformation or displacement of associated magnetic-field-influencing portions 18' of the vehicle 12 in proximate operative relationship to coil elements 14 of the plurality of coil elements 14. Measurements of the voltage v across and current i through the coil elements 14 provide associated time varying sensed signals 94 that provide for generating at least one detected signal 38 responsive thereto and responsive to, or a measure of, the associated complex impedance Z of the associated plurality or pluralities of coil elements 14 or subsets 78 thereof, which provides for a measure responsive to the dynamics of an approaching external magnetic-field-influencing object 64, 64' (e.g. metal, metalized or ferromagnetic), or responsive to the dynamics of deformation of the at least one magnetic-field-influencing object 64 constituting portions 18 of the vehicle 12 responsive to a crash, and which are in operative proximate relationship to the plurality or pluralities of coil elements 14 or subsets 78 thereof. The time varying sensed signals 94 are responsive to ferromagnetic and eddy current affects on the associated complex impedance Z of each of the associated plurality or pluralities of coil elements 14 or subsets 78 thereof spanning a substantial region 44 of a body or structural element 46 to be sensed.

In accordance with one aspect of the magnetic sensor 10, either the geometry of first $L_1$' and at least second $L_2$' coil elements associated with different first 18.1 and at least second 18.2 portions of the vehicle 12, the associated at least one time-varying signal 24, or an associated at least one detection process of an associated at least one detection circuit 32, are adapted so as to provide that a first response of the at least one detection circuit 32 to a first sensed signal component from a first coil element $L_1$' is substantially normalized—e.g. with respect to respective magnitudes or signal-to-noise rations of the associated sensed signal components—with respect to at least a second response of the at least one detection circuit 32 to at least a second sensed signal component from at least the second coil element $L_2$' for a comparably significant crash or proximity stimulus or stimuli affecting the first 18.1 and at least second 18.2 portions of the vehicle 12. Accordingly, in addition to being distributed over a region of space associated with an associated sensing region 16, for an associated sensing region 16 spanning different portions 18.1, 18.2, 18.3, 18.4 and 18.k of the vehicle 12 that are magnetically different in their associated influence on the associated plurality of coil elements 14, at least one of at least one geometry of the plurality of coil elements 14, the at least one time-varying signal 24, and at least one detection process is adapted so that at least one of a first condition, a second condition and a third condition is satisfied so as to provide that a first response of the at least one detection circuit 32 to a first sensed signal component from a first coil element $L_1$' is substantially normalized with respect to at least a second response of the at least one detection circuit 32 to at least a second sensed signal component from at least the second coil element $L_2$' for a comparably significant crash stimulus or stimuli affecting the first 18.1 and at least second 18.2 portions of the vehicle 12.

The first condition is satisfied if the geometry—e.g. the size, shape, or number of turns—of the first $L_1$' and at least a second $L_2$' coil element are different. For example, referring to FIG. 1, the first coil element $L_1$' being relatively closer in proximity to the corresponding first portion 18.1 of the vehicle 12 has fewer turns than the corresponding third $L_3$' or fourth $L_4$' coil elements which are relatively further in proximity to the corresponding third 18.3 and fourth 18.4 portions of the vehicle 12, respectively.

The second condition is satisfied if a first time-varying signal 24.1 operatively coupled to a first coil element $L_1$' is different from at least a second time-varying signal 24.2 operatively coupled to at least a second coil element $L_2$'. For example, referring to FIG. 12 or 13, at least two different coil elements 14 or subsets 78 thereof are driven by different associated time-varying signal sources 80.1 and 80.2. If the associated different coil elements 14 each have substantially the same geometry, but have a different magnetic coupling to the associated first 18.1 and at least second 18.2 different portions of the vehicle 12, e.g. as illustrated in FIG. 1, then different coil elements 14 could be driven with different associated levels of the associated time-varying signals 24.1 and 24.2, e.g. a coil element 14 of closer proximity to the associated portion 18 of the vehicle 12 being driven at a lower voltage than a coil element 14 of further proximity, so that strength of the associated corresponding magnetic field components 30.1, 30.2 are inversely related to the associated magnetic coupling, so that the affect on the detected signal 38 of a change in the first portion 18.1 of the vehicle 12 is comparable to the affect on the detected signal 38 of a change in the second portion 18.2 of the vehicle 12 for each change corresponding to a relatively similar crash or proximity stimulus or stimuli affecting the first 18.1 and at least second 18.2 portions of the vehicle 12.

The third condition is satisfied if a first detection process of the at least one detection circuit 32 operative on a first sensed signal component from or associated with a first coil element $L_1'$ is different at least a second detection process of the at least one detection circuit 32 operative on at least a second sensed signal component from or associated with at least a second coil element $L_2'$. For example, the associated signal gain associated with processing different signals from different coil elements 14 can be different, e.g. the signal from a coil element 14 of closer proximity to an associated first portion 18.1 of the vehicle 12 could be amplified less than the signal from a coil element 14 of further proximity to an associated second portion 18.2 of the vehicle 12, so that the affect on the detected signal 38 of a change in the first portion 18.1 of the vehicle 12 is comparable to the affect on the detected signal 38 of a change in the second portion 18.2 of the vehicle 12 for each change corresponding to a relatively similar crash or proximity stimulus or stimuli affecting the first 18.1 and at least second 18.2 portions of the vehicle 12.

Referring to FIGS. 15a, 15b, 16a and 16b one or more different portions 18 of the vehicle 12 or object 64' being sensed may be adapted to cooperate at least one of the plurality of coil elements 14. For example, referring to FIGS. 15a, 15b, in accordance with a first embodiment of a fifth aspect 10.5 of a magnetic sensor 10, a conductive element 96 is operatively associated with, or a part of, at least a portion 18 of the vehicle 12 or object 64' being sensed so as to cooperate at least one of the plurality of coil elements 14, for example coil elements $L_1', L_2', L_3'$, so as to either provide for or control associated eddy currents 52 in the conductive element 96 responsive to the associated magnetic field components 30.1, 30.2 and 30.3 generated by the associated coil elements $L_1', L_2', L_3'$ proximate thereto. The magnetic axes 98 of the coil elements $L_1', L_2', L_3'$ are oriented so that the associated magnetic field components 30.1, 30.2 and 30.3 interact with the conductive element 96 so as to generate associated eddy currents 52 therein in accordance with Lenz's Law. The conductive element 96 comprises, for example, a thin metal sheet, film or coating, comprising, for example, either a paramagnetic or diamagnetic material that is relatively highly conductive, e.g. aluminum or copper, and which, for example, could be an integral part of the associated portion 18 of the vehicle 12. For example, the conductive element 96 could be spray coated onto the surface of the associated portion 18 of the vehicle 12. The frequency of the associated at least one time-varying signal 24 applied to the associated coil elements $L_1', L_2', L_3'$ may be adapted so that the corresponding oscillating magnetic field components 30.1, 30.2 and 30.3 generated by the coil elements $L_1', L_2', L_3'$ provide for generating the associated eddy currents 52 in the conductive element 96. For example, the conductive element 96 could be added to a non-metallic portion 100 of the vehicle 12 so as to provide for magnetic visibility thereof by the associated at least one of the plurality of coil elements 14.

A conductive element 96 could also be added to a ferrous element 102, although in order for the affect of the magnetic field component(s) 30 to dominate an affect of a magnetic field within the ferrous element 102, the associated conductive element 96 would need to be thick enough or conductive enough to prevent the original transmitted magnetic field component(s) 30 from penetrating though to the ferrous element 102 on the other side of the conductive element 96, whereby eddy currents 52 in the conductive element 96 would completely cancel the magnetic field at some depth of penetration into the conductive element 96. For example, for a superconducting conductive element 96, there would be no penetration of the magnetic field component(s) 30 into the conductive element 96. Although the depth of penetration of the magnetic field increases as the conductivity of the conductive element 96 decreases, an aluminum or copper conductive element 96 would not need to be very thick (e.g. 2.5 mm or less) in order to substantially achieve this affect. The depth of penetration of magnetic fields into conductive elements 96 is known from the art using eddy currents for non-destructive testing, for example, as described in the technical paper eddyc.pdf available from the internet at http://joe.buckley.net/papers, which technical paper is incorporated herein by reference. Generally, if the thickness of the conductive element 96 exceeds about three (3) standard depths of penetration at the magnetic field frequency, then substantially no magnetic field will transmit therethrough. Responsive to a crash with an impacting object of sufficient energy to deform or translate the conductive element 96, changes to the shape or position thereof relative to at least one of the coil elements $L_1', L_2', L_3'$ affects at least one of the associated magnetic field components 30.1, 30.2 and 30.3, which affect is detected by an associated detection circuit 32 operatively coupled to the coil elements $L_1', L_2', L_3'$ as described hereinabove.

The conductive element 96 may comprise a pattern 104 adapted to control associated eddy currents 52 therein. For example, the conductive element 96 may be adapted by either etching, forming (e.g. which a sheet metal forming tool), coating (e.g. with an E-coat process), or machining the pattern 104 in or on a surface thereof so as to control, e.g. limit, the associated eddy currents 52. The format, depth, and distribution of the pattern 104 can be optimized to provide optimal sensing resolution for a given operating frequency. The conductive element 96 could be designed so that the movement or deformation thereof is highly visible to at least one of the plurality of coil elements 14 so as to increase the confidence of a timely associated crash or proximity detection. Each portion of the pattern 104 extends through at least a portion of the conductive element 96 so as to provide for blocking or impeding eddy currents 52 thereacross, so that the associated eddy currents 52 become primarily confined to the contiguous conductive portions 106 therebetween or thereunder. For example, the pattern 104 may adapted to a frequency of the at least one time-varying signal 24.

Referring to FIGS. 16a and 16b, in accordance with a second embodiment of the fifth aspect 10.5 of a magnetic sensor 10, a conductive portion 108 of at least one of the portions 18 of the vehicle 12—for example, an inner surface of a body of the vehicle 12—adapted to cooperate with the plurality of coil elements 14 comprises a pattern 104 adapted to control associated eddy currents 52 therein. The magnetic axes 98 of the coil elements L' are oriented so that the associated magnetic field components 30 interact with the conductive portion 108 so as to generate associated eddy currents 52 therein in accordance with Lenz's Law. The conductive portion 108 may be adapted, for example, by either etching, forming (e.g. which a sheet metal forming tool), coating (e.g.

with an E-coat process), or machining a pattern 104 in or on a surface thereof so as to control, e.g. limit, the associated eddy currents 52 therein. The format, depth, and distribution of the pattern 104 can be optimized to provide optimal sensing resolution for a given operating frequency. For example, a deterministic pattern 104', such as the grid-etched pattern illustrated in FIG. 16b may provide for distinguishing the associated portions 18 of the vehicle 12 responsive to displacement or deformation thereof. Each portion of the pattern 104 extends through at least a portion of the conductive portion 108 so as to provide for blocking or impeding eddy currents 52 thereacross, so that the associated eddy currents 52 become primarily confined to the contiguous conductive portions 110 therebetween or thereunder. For example, the pattern 104 may adapted to a frequency of the at least one time-varying signal 24.

In accordance with a sixth aspect 10.6 of a magnetic sensor 10, a conductive element 112 is adapted to cooperate with at least one of the plurality of coil elements 14 so as to provide for shaping, controlling or limiting at least one the associated magnetic field components 30. For example, referring to FIG. 17, in accordance with a first embodiment of the sixth aspect 10.6 of the magnetic sensor 10, the plurality of coil elements 14 are operatively coupled to a first side 114 of a substrate 62, and the conductive element 112 comprises a conductive layer 112', e.g. a conductive film or plate spanning a portion of the opposite, second side 116 of the substrate 62, for example, as could be embodied with a printed circuit board 66. The conductive element 112 is relatively fixed with respect to the plurality of coil elements 14 and provides for effectively shielding the plurality of coil elements 14 proximate thereto from interference from proximate metal objects on the second side 116 of the substrate 62, so as to effectively provide for a non-sensing side 118 of the plurality of coil elements 14 so shielded. The shielding action of the conductive element 112 results from eddy currents 52 that are induced therein by the associated magnetic field components 30 of the associated plurality of coil elements 14.

Referring to FIGS. 18a and 18b, in accordance with a second embodiment of the sixth aspect 10.6 of a magnetic sensor 10, at least a portion of the conductive element 112 may be adapted to control or mitigate against eddy currents 52 therein. For example, the conductive element 112 may be adapted, for example, by either etching, forming (e.g. with a sheet metal forming tool), or machining a pattern 104 in or on a surface thereof so as to control, e.g. limit, the associated eddy currents 52 therein. The format, depth, and distribution of the pattern 104 can be optimized to provide optimal sensing resolution for a given operating frequency. Each portion of the pattern 104 extends through at least a portion of the conductive element 112 so as to provide for blocking or impeding eddy currents 52 thereacross, so that the associated eddy currents 52 become primarily confined to the contiguous conductive portions 110 therebetween or thereunder. For example, the pattern 104 may adapted to a frequency of the at least one time-varying signal 24. Furthermore, the depth of the pattern 104 may adapted so that a plurality of contiguous conductive portions 110 are electrically isolated from one another.

Referring to FIGS. 19a, 19b, 20a and 20b, in accordance with a seventh aspect 10.7 of a magnetic sensor 10, at least one relatively larger coil element $L_1'$ of the plurality of coil elements 14 at least partially surrounds at least another relatively smaller coil element $L_2'$ of the plurality of coil elements, wherein both the relatively larger coil element $L_1'$ and the relatively smaller coil element $L_2'$ are associated with the same general sensing region 16, but each exhibits either a different sensitivity thereto or a different span thereof. For example, referring to FIGS. 19a and 19b, in accordance with a first embodiment of the seventh aspect 10.7 of a magnetic sensor 10, a first relatively larger coil element $L_1'$ surrounds a second relatively smaller coil element $L_2'$, wherein both coil elements $L_1'$, $L_2'$ may be either driven by the same oscillatory or pulsed time-varying signal source 20; or by different oscillatory or pulsed time-varying signal sources 20, each providing either the same or different time-varying signals 24, wherein different time-varying signals 24 could differ by signal type, e.g. oscillatory or pulsed, waveform shape, oscillation frequency or pulsewidth, signal level or power level. The numbers of turns of the coil elements $L_1'$, $L_2'$, or the associated heights thereof, can be the same or different as necessary to adapt the relative sensitivity of the relatively larger coil element $L_1'$ in relation to the relatively smaller coil element $L_2'$ responsive to particular features of a particular magnetic-field-influencing object 64 being sensed. For example, the relatively larger coil element $L_1'$ could have either the same, a greater number, or a lesser number of turns relative to the relatively smaller coil element $L_2'$, or the relatively larger coil element $L_1'$ could have either the same, a greater, or a lesser height than the relatively smaller coil element $L_2'$. Referring to FIGS. 19a and 19b, the relatively larger coil element $L_1'$ and the relatively smaller coil element $L_2'$ are adapted to sense the inside of a door 120 of the vehicle 12, and are substantially concentric with the associated respective centers 122, 124 being substantially aligned with an associated door beam 126 constituting a substantial magnetic-field-influencing object 64 to be sensed, wherein the relatively smaller coil element $L_2'$ would be relatively more sensitive to the door beam 126 than the relatively larger coil element $L_1'$, the latter of which would also be responsive to relatively upper and lower regions of the associated outer skin 128 of the door 120.

Referring to FIGS. 20a and 20b, in accordance with a second embodiment of the seventh aspect 10.7 of the magnetic sensor 10, the center 122 of the relatively larger coil element $L_1'$ is located below the center 124 of the relatively smaller coil element $L_2'$, the latter of which is substantially aligned with the door beam 126, so that the sensing region 16 of the relatively larger coil element $L_1'$ is biased towards the lower portion 130 of the door 120. Accordingly, the relative position of the relatively larger coil element $L_1'$ in relation to the relatively smaller coil element $L_2'$ can be adapted to enhance or reduce the associated sensitivity thereof to the magnetic-field-influencing object 64 being sensed, or to portions thereof.

Figure 22:
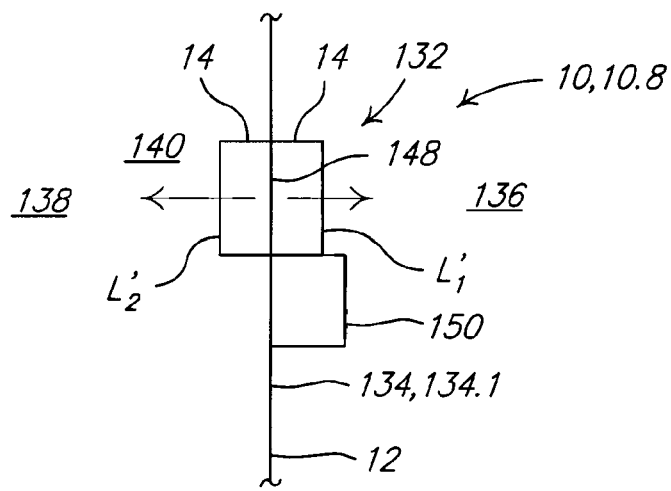
FIG. 22 illustrates an embodiment of the eighth aspect of the magnetic sensor.

Referring to FIGS. 21 and 22, in accordance with an embodiment of the eighth aspect 10.8 of the magnetic sensor 10, the magnetic sensor 10 comprises first $L_1'$ and second $L_2'$ coil elements relatively fixed with respect to one another and packaged together in a sensor assembly 132 adapted to be mounted on an edge 134 of a door 120 so that the first coil element $L_1'$ faces the interior 136 of the door 120, and the second coil element $L_2'$ faces the exterior 138 of the door 120 towards the proximate gap 140 between the edge 134 of the door 120 and an adjacent pillar 142, e.g. a B-pillar 142.1 for a sensor assembly 132 adapted to cooperate with a front door 120'. For example, in the embodiment illustrated in FIG. 21, the sensor assembly 132 is mounted proximate to the striker 144 on a rear edge 134.1 of the door 120, so as to be responsive to distributed loads from the door beam 126, wherein the front edge 134.2 of the door 120 attached to the A-pillar 142.2 with associated hinges 146. The first $L_1'$ and second $L_2'$ coil elements can be substantially magnetically isolated from one another with a conductive and/or ferrous shield 148 therebetween, e.g. a steel plate. The first coil element $L_1'$ is responsive to a deformation of the door 120 affecting the interior 136 thereof, e.g. responsive to a crash involving the door 120, whereas the second coil element $L_2'$ is responsive to changes in the proximate gap 140 between the door 120 and the proximate pillar 142, e.g. responsive to an opening or deformation condition of the door 120. Accordingly, the sensor assembly 132 mounted so as to straddle an edge 134 of the door 120 provides for measuring several distinct features associated with crash dynamics. The sensor assembly 132 could be mounted on any edge 134 of the door 120, e.g. edges 134.2, 134.1 facing the A-pillar 142.2, B-pillar 142.1 or on the bottom edge 134.3 of the door 120, wherein, for example, the position, size, coil parameters, frequency or pulsewidth of the associated at least one time-varying signal 24, and power thereof, so as to provide for optimizing the discrimination of a crash from associated detected signal or signals 38, or associated components thereof, associated with the first $L_1'$ and second $L_2'$ coil elements responsive to deformation of the door 120 and changes in the associated proximate gap or gaps 140. The sensor assembly 132 can further incorporate an electronic control unit (ECU) 150 incorporating the associated signal conditioner and preprocessor circuits 34 and an associated detection circuit 32, processor 36 and controller 40. The magnetic sensor 10 can be adapted as a self contained satellite utilizing associated shared electronics, or can incorporated shared connectors and mechanical mounting. The associated detected signal or signals 38, or associated components thereof, associated with the first $L_1'$ and second $L_2'$ coil elements can be either used together for crash discrimination, or can be used for combined self-safing and crash discrimination.

Figure 23:
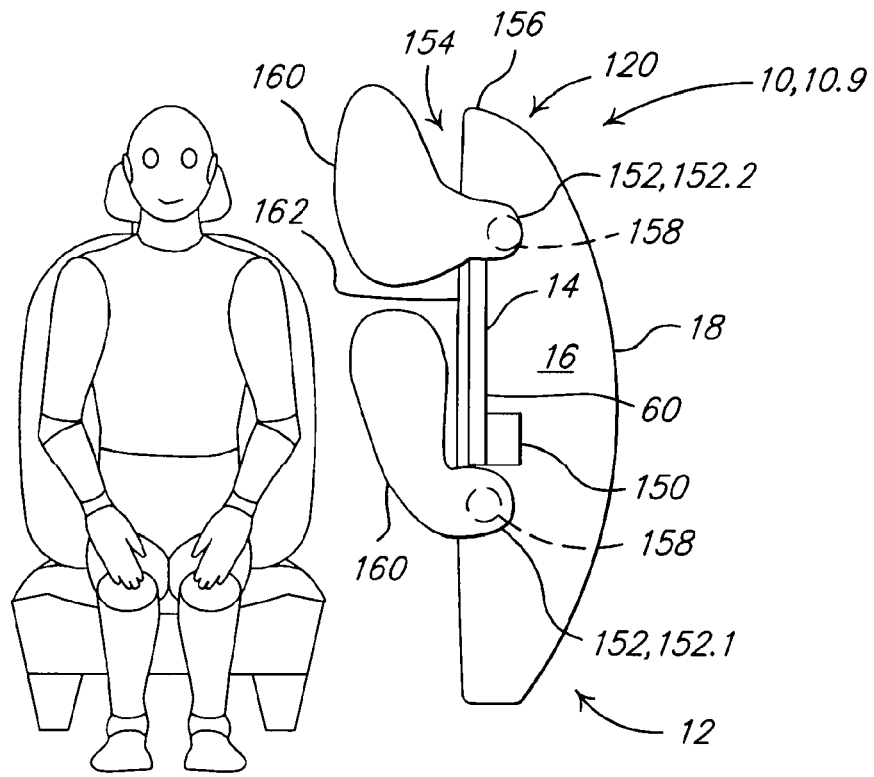
FIG. 23 illustrates an embodiment of a ninth aspect of a magnetic sensor associated with an air bag inflator.

Referring to FIG. 23, in accordance with an embodiment of a ninth aspect 10.9 of a magnetic sensor 10, a plurality of coil elements 14, e.g. in a distributed coil 60, together with an associated electronic control unit (ECU) 150, are operatively associated with one or more side-impact air bag inflator modules 152, for example, mounted together therewith, in a safety restraint system 154 comprising a combined side crash sensing and side-impact air bag inflator module 156 so as to provide for a combined side impact crash sensor, one or more gas generators 158, and one or more associated air bags 160, in a single package. The combined side crash sensing and side-impact air bag inflator module 156 could be placed on or proximate to an interior surface 162 of a door 120, so as to provide for interior deployment of the associated one or more air bags 160 responsive to the sensing of a crash with the associated magnetic sensor 10 responsive to the influence of a deformation of the door 120 on the associated plurality of coil elements 14 as detected by the associated detection circuit 32 in the electronic control unit (ECU) 150, and the associated generation of a control signal thereby to control the actuation of the associated one or more gas generators 158 in the associated one or more side-impact air bag inflator modules 152. For example, the side-impact air bag inflator modules 152 incorporated in the safety restraint system 154 illustrated in FIG. 23 comprise a first side-impact air bag inflator module 152.1 adapted for thorax protection, and a second side-impact air bag inflator module 152.2 adapted for head protection.

Figure 24:
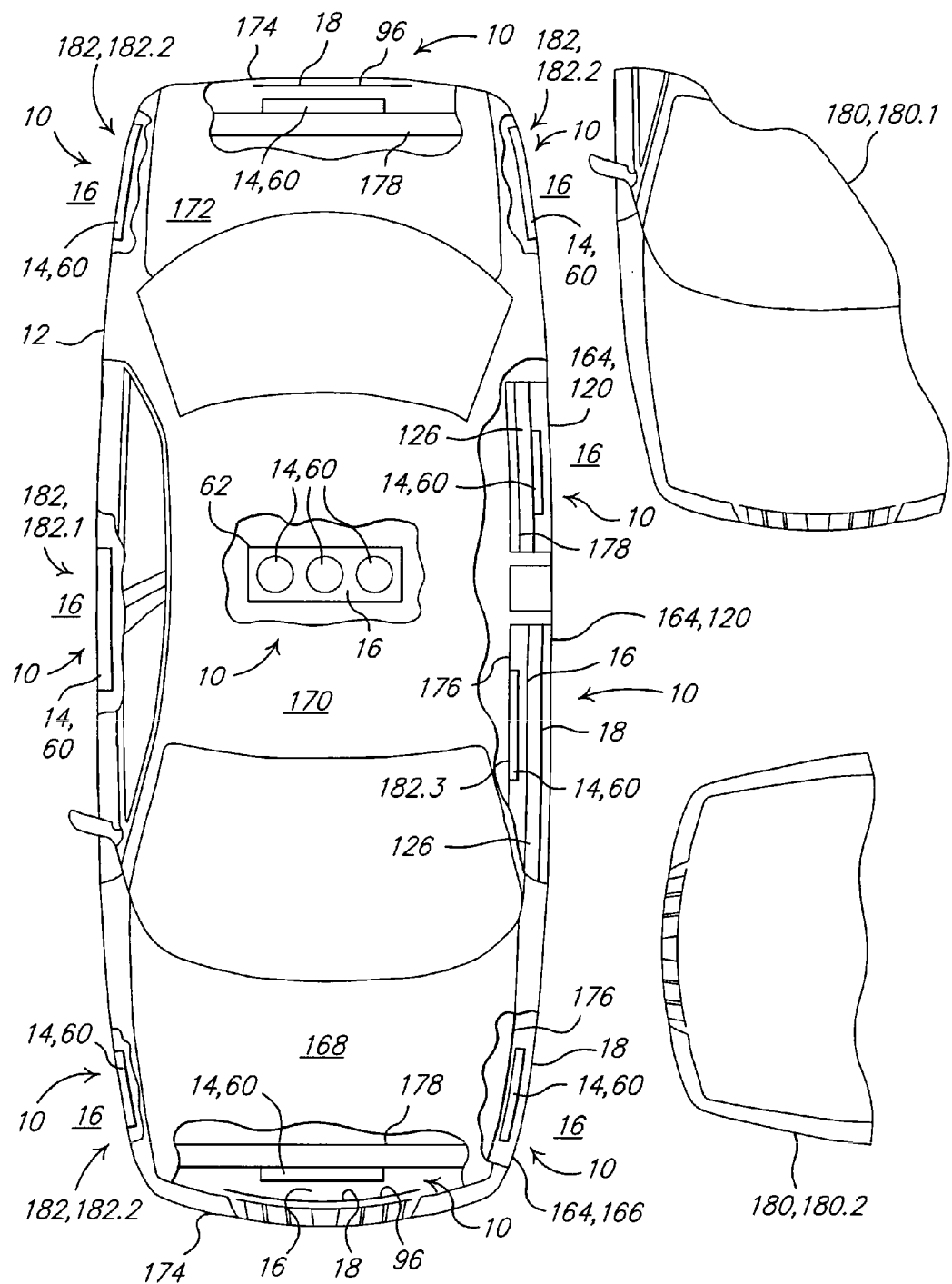
FIG. 24 illustrates various embodiments of a magnetic sensor in a vehicle.

Referring to FIG. 24, the above described magnetic sensor 10 can be adapted for various sensing applications in a vehicle 12. For example, in one set of embodiments, a plurality of coil elements 14 are adapted so as to provide for sensing a deformation of a body portion 164 of the vehicle 12, for example, a door 120, a quarter-panel 166, a hood 168, a roof 170, a trunk 172, or a bumper 174 of the vehicle 12, wherein, for example, the associated plurality of coil elements 14, e.g. distributed coil 60, would be operatively coupled to either a proximate inner panel 176 or structural member 178 so as to be relatively fixed with respect to the associated deforming body portion 164 during the early phase of an associated event causing the associated deformation, e.g. an associated crash or roll-over event. In accordance with another set of embodiments, the plurality of coil elements 14, e.g. distributed coil 60, may be mounted inside the door 120 of the vehicle 12 and adapted to provide for detecting a deformation of an associated door beam 126. In accordance with yet another set of embodiments, the plurality of coil elements 14 are adapted so as to provide for detecting a proximity of a second vehicle 180 relative to the vehicle 12, for example, the proximity of a second vehicle 180.1 traveling in or from an adjacent lane near or towards the vehicle 12, or a second vehicle 180.2 traveling along a path intersecting that of the vehicle 12 towards an impending side impact therewith. For example, the associated plurality of coil elements 14, e.g. distributed coil 60, of the magnetic sensor 10 may be integrated into a trim or gasket portion 182 of the vehicle 12, for example either a door trim portion 182.1, a body trim portion 182.2, or an interior trim portion 182.3. In each of these applications, the associated assembly of the associated plurality of coil elements 14, e.g. distributed coil 60, may be integrated with, into, or on an existing component of the vehicle 12 having a different primary function. The plurality of coil elements 14, e.g. distributed coil 60, can provide for a relatively broad sensing region 16 using a single associated distributed coil 60 assembly.

While specific embodiments have been described in detail, those with ordinary skill in the art will appreciate that various modifications and alternatives to those details could be developed in light of the overall teachings of the disclosure. Accordingly, the particular arrangements disclosed are meant to be illustrative only and not limiting as to the scope of the invention, which is to be given the full breadth of any claims which are derivable from the description herein, and any and all equivalents thereof.

What is claimed is:

1. A magnetic sensor, comprising:
   a. a plurality of coil elements, wherein said plurality of coil elements comprise at least first and second coil elements, and said first and second coil elements are either separated from one another or overlapping one another;
   b. at least one time-varying signal source of at least one time-varying signal operatively coupled to said plurality of coil elements, wherein said first and second coil elements are electrically in series with one another and are driven by said at least one time-varying signal source, said first coil element is adapted to generate a first magnetic field component responsive to said at least one time-varying signal, at least said second coil element of said plurality of coil elements is adapted to generate at least a second magnetic field component responsive to said at least one time-varying signal, and said first coil element and said at least said second coil element are adapted so that said first magnetic field component and said at least said second magnetic field component interact with different first and at least second portions of a first vehicle when said plurality of coil elements are in a cooperative relationship with said first vehicle; and
   c. at least one detection circuit operatively coupled to said plurality of coil elements, wherein said at least one detection circuit generates a detected signal responsive to a first sensed signal component from said first coil element responsive to said first magnetic field component and responsive to at least a second sensed signal component from said at least said second coil element responsive to said at least said second magnetic field component, and said detected signal provides for detecting a change in a magnetic condition of or associated with said first vehicle.

2. A magnetic sensor as recited in claim 1, wherein said plurality of coil elements are mounted on a front or rear frame member of said first vehicle are adapted to provide for detecting a deformation of an associated bumper of said first vehicle.

3. A magnetic sensor as recited in claim 1, wherein said plurality of coil elements are electrically in series with one another so as to constitute a distributed coil.

4. A magnetic sensor as recited in claim 1, wherein said plurality of coil elements span a substantial region of a body or structural element of said first vehicle, wherein said body or structural element of said vehicle is susceptible to deformation responsive to a crash.

5. A magnetic sensor as recited in claim 1, wherein said plurality of coil elements are operatively coupled to a substrate.

6. A magnetic sensor as recited in claim 5, wherein said substrate is curved.

7. A magnetic sensor as recited in claim 5, wherein said substrate comprises a flexible material.

8. A magnetic sensor as recited in claim 5, wherein said plurality of coil elements are formed from a printed circuit board.

9. A magnetic sensor as recited in claim 5, wherein said plurality of coil elements comprise at least one winding attached to said substrate.

10. A magnetic sensor as recited in claim 1, further comprising a conductive element adapted to cooperate with at least one of said plurality of coil elements so as to provide for shaping, controlling or limiting at least one of said first magnetic field component and said at least said second magnetic field component.

11. A magnetic sensor as recited in claim 10, wherein at least a portion of said conductive element is adapted to control or mitigate against eddy currents therein.

12. A magnetic sensor as recited in claim 1, wherein said plurality of coil elements are adapted to cooperate with an air bag inflator module.

13. A magnetic sensor as recited in claim 1, wherein said air bag inflator module is adapted to deploy an air bag from a door towards an interior of said first vehicle, and said plurality of coil elements are adapted to be responsive to a deformation of a structural or exterior portion of said door.

14. A magnetic sensor as recited in claim 1, wherein said plurality of coil elements are mounted inside a door of said first vehicle and are adapted to provide for detecting a deformation of a door beam of said door.

15. A magnetic sensor as recited in claim 1, wherein said plurality of coil elements are encapsulated.

16. A magnetic sensor as recited in claim 1, wherein said at least one time-varying signal source comprises a time-varying voltage source, and said at least one detection circuit is responsive to at least one current signal through at least one of said plurality of coil elements.

17. A magnetic sensor as recited in claim 1, wherein said at least one time-varying signal source comprises a time-varying current source, and said at least one detection circuit is responsive to at least one voltage signal across at least one of said plurality of coil elements.

18. A magnetic sensor as recited in claim 1, wherein said at least one time-varying signal comprises an oscillatory waveform selected from a sinusoid waveform, a triangular ramped waveform, a triangular saw tooth waveform, and a square waveform.

19. A magnetic sensor as recited in claim 1, wherein said at least one time-varying signal comprises an oscillatory waveform comprising a plurality of different frequencies.

20. A magnetic sensor as recited in claim 1, wherein said at least one time-varying signal comprises a pulsed waveform.

21. A magnetic sensor as recited in claim 20, wherein said pulsed waveform has a shape of either a ramp, a saw tooth, an impulse or a rectangle.

22. A magnetic sensor as recited in claim 1, wherein at least one of said plurality of coil elements is driven by a first time-varying signal from a first time-varying signal source, at least another of said plurality of coil elements is driven by at least a second time-varying signal from at least a second time-varying signal source, and said first time-varying signal is different from at least one said second time-varying signal.

23. A magnetic sensor as recited in claim 1, wherein said at least one detection circuit provides for detecting different signals from different subsets of said plurality of coil elements.

24. A magnetic sensor as recited in claim 1, wherein said plurality of coil elements are adapted so as to provide for detecting a proximity of a second vehicle relative to said first vehicle.

25. A magnetic sensor as recited in claim 1, wherein said at least one detection circuit provides for detecting a complex impedance of at least one of said plurality of coil elements.

26. A magnetic sensor as recited in claim 1, wherein said plurality of coil elements are adapted so as to provide for shaping an associated magnetic field responsive to at least one magnetic-field influencing property of at least one portion of said first vehicle in proximity to said plurality of coil elements.

27. A magnetic sensor as recited in claim 1, wherein said at least one detection circuit provides for sampling in-phase and quadrature-phase signal components.

28. A magnetic sensor as recited in claim 1, wherein at least two coil elements of said plurality of coil elements each comprise substantially at least one turn.

29. A magnetic sensor as recited in claim 1, wherein at least one of said plurality of coil elements comprises a plurality of turns.

30. A magnetic sensor as recited in claim 1, wherein at least two coil elements of said plurality of coil element are of different sizes.

31. A magnetic sensor as recited in claim 30, wherein said at least one of said plurality of coil elements and said at least another of said plurality of coil elements are substantially concentric with one another.

32. A magnetic sensor as recited in claim 1, wherein at least one of said plurality of coil elements at least partially surrounds at least another of said plurality of coil elements.

33. A magnetic sensor as recited in claim 1, wherein at least one of said first and at least second portions of said first vehicle is adapted to cooperate with said at least one of said plurality of coil elements.

34. A magnetic sensor as recited in claim 33, further comprising a conductive element operatively associated with or a part of at least one of said first and at least second portions of said first vehicle so as to cooperate with said at least one of said plurality of coil elements.

35. A magnetic sensor as recited in claim 34, wherein said conductive element comprises a pattern adapted to control associated eddy currents therein.

36. A magnetic sensor as recited in claim 35, wherein said conductive element is adapted by either etching, forming or coating said pattern in or on a surface of said conductive element so as to control said eddy currents.

37. A magnetic sensor as recited in claim 33, wherein a conductive portion of at least one of said first and at least second portions of said first vehicle is adapted to control associated eddy currents therein.

38. A magnetic sensor as recited in claim 37, wherein said conductive portion comprises a pattern adapted to control said eddy currents.

39. A magnetic sensor as recited in claim 38, wherein at least a portion of said conductive portion is adapted by either etching, forming or coating said pattern in or on a surface of said conductive portion so as to control said eddy currents.

40. A magnetic sensor as recited in claim 1, wherein said plurality of coil elements are adapted so as to provide for sensing a deformation of a body portion of said first vehicle.

41. A magnetic sensor as recited in claim 40, wherein said body portion comprises either a door, a quarter-panel, a hood, a roof, a trunk, or a bumper of said first vehicle.

42. A magnetic sensor as recited in claim 1, further comprising an air bag inflator module, wherein said plurality of coil elements are mounted together with said air bag inflator module, so that when said air bag inflator module is mounted in said vehicle, said plurality of coil elements are responsive to a magnetic influence of a proximal portion of said vehicle.

43. A magnetic sensor as recited in claim 42, wherein said air bag inflator module is adapted to deploy an air bag from a door towards an interior of said vehicle, and said plurality of coil elements are adapted to be responsive to a deformation of a proximal structural or exterior portion of said door.

44. A magnetic sensor, comprising:
  a. a plurality of coil elements, wherein said plurality of coil elements are operatively coupled to a substrate, and said plurality of coil elements comprise a two-dimensional array of said plurality of coil elements on said substrate;
  b. at least one time-varying signal source of at least one time-varying signal operatively coupled to said plurality of coil elements, wherein a first coil element or said plurality of coil elements is adapted to generate a first magnetic field component responsive to said at least one time-varying signal, at least a second coil element of said plurality of coil elements is adapted to generate at least a second magnetic field component responsive to said at least one time-varying signal, and said first coil element and said at least said second coil element are adapted so that said first magnetic field component and said at least said second magnetic field component interact with different first and at least second portions of a vehicle when said plurality of coil elements are in a cooperative relationship with said vehicle; and
  c. at least one detection circuit operatively coupled to said plurality of coil elements, wherein said at least one detection circuit generates a detected signal responsive to a first sensed signal component from said first coil element responsive to said first magnetic field component and responsive to at least a second sensed signal component from said at least said second coil element responsive to said at least said second magnetic field component, and said detected signal provides for detecting a change in a magnetic condition of or associated with said vehicle.

45. A magnetic sensor, comprising:
  a. a plurality of coil elements;
  b. a conductive element adapted to cooperate with at least one of said plurality of coil elements so as to provide for shaping, controlling or limiting at least one of said first magnetic field component and said at least said second magnetic field component, wherein said plurality of coil elements are operatively coupled to a first side of a substrate, and said conductive element comprises a conductive layer on a second side of said substrate, wherein said second side of said substrate is opposite to said first side of said substrate;
  c. at least one time-varying signal source of at least one time-varying signal operatively coupled to said plurality of coil elements, wherein a first coil element of said plurality of coil elements is adapted to generate a first magnetic field component responsive to said at least one time-varying signal, at least a second coil element of said plurality of coil elements is adapted to generate at least a second magnetic field component responsive to said at least one time-varying signal, and said first coil element and said at least said second coil element are adapted so that said first magnetic field component and said at least said second magnetic field component interact with different first and at least second portions of a vehicle when said plurality of coil elements are in a cooperative relationship with said vehicle; and
  d. at least one detection circuit operatively coupled to said plurality of coil elements, wherein said at least one detection circuit generates a detected signal responsive to a first sensed signal component from said first coil element responsive to said first magnetic field component and responsive to at least a second sensed signal component from said at least said second coil element responsive to said at least said second magnetic field component, and said detected signal provides for detecting a change in a magnetic condition of or associated with said vehicle.

46. A magnetic sensor, comprising:
  a. a plurality of coil elements;
  b. at least one time-varying signal source of at least one time-varying signal operatively coupled to said plurality of coil elements, wherein a first coil element of said plurality of coil elements is adapted to generate a first magnetic field component responsive to said at least one time-varying signal, at least a second coil element of said plurality of coil elements is adapted to generate at least a second magnetic field component responsive to said at least one time-varying signal, and said first coil element and said at least said second coil element are adapted so that said first magnetic field component and said at least said second magnetic field component interact with different first and at least second portions of a vehicle when said plurality of coil elements are in a cooperative relationship with said vehicle;
  c. at least one detection circuit operatively coupled to said plurality of coil elements, wherein said at least one detection circuit generates a detected signal responsive to a first sensed signal component from said first coil element responsive to said first magnetic field component and responsive to at least a second sensed signal component from said at least said second coil element responsive to said at least said second magnetic field component, and said detected signal provides for detecting a change in a magnetic condition of or associated with said vehicle; and
  d. a conductive element adapted to cooperate with at least one of said plurality of coil elements so as to provide for shaping, controlling or limiting at least one of said first magnetic field component and said at least said second magnetic field component, wherein said conductive element comprises a plurality of conductive portions that are electrically isolated from one another.

47. A magnetic sensor, comprising:
a. a plurality of coil elements;
b. at least one time-varying signal source of at least one time-varying signal operatively coupled to said plurality of coil elements, wherein a first coil element of said plurality of coil elements is adapted to generate a first magnetic field component responsive to said at least one time-varying signal, at least a second coil element of said plurality of coil elements is adapted to generate at least a second magnetic field component responsive to said at least one time-varying signal, and said first coil element and said at least said second coil element are adapted so that said first magnetic field component and said at least said second magnetic field component interact with different first and at least second portions of a vehicle when said plurality of coil elements are in a cooperative relationship with said vehicle; and
c. at least one detection circuit operatively coupled to said plurality of coil elements, wherein said at least one detection circuit generates a detected signal responsive to a first sensed signal component from said first coil element responsive to said first magnetic field component and responsive to at least a second sensed signal component from said at least said second coil element responsive to said at least said second magnetic field component, said detected signal provides for detecting a change in a magnetic condition of or associated with said vehicle, said at least one detection circuit provides for detecting different signals from different subsets of said plurality of coil elements, and at least two of said different subsets of said plurality of coil elements associated with at least two of said different signals are connected in series.

48. A magnetic sensor, comprising:
a. a plurality of coil elements;
b. at least one time-varying signal source of at least one time-varying signal operatively coupled to said plurality of coil elements, wherein a first coil element of said plurality of coil elements is adapted to generate a first magnetic field component responsive to said at least one time-varying signal, at least a second coil element of said plurality of coil elements is adapted to generate at least a second magnetic field component responsive to said at least one time-varying signal, and said first coil element and said at least said second coil element are adapted so that said first magnetic field component and said at least said second magnetic field component interact with different first and at least second portions of a first vehicle when said plurality of coil elements are in a cooperative relationship with said first vehicle; and
c. at least one detection circuit operatively coupled to said plurality of coil elements, wherein said at least one detection circuit generates a detected signal responsive to a first sensed signal component from said first coil element responsive to said first magnetic field component and responsive to at least a second sensed signal component from said at least said second coil element responsive to said at least said second magnetic field component, and said detected signal provides for detecting a change in a magnetic condition of or associated with said first vehicle;
d. wherein at least one of at least one geometry of said plurality of coil elements, said at least one time-varying signal, and at least one detection process is adapted so that at least one of a first condition, a second condition and a third condition is satisfied so as to provide that a first response of said at least one detection circuit to said first sensed signal component is substantially normalized with respect to at least a second response of said at least one detection circuit to said at least said second sensed signal component for a comparably significant crash or proximity stimulus or stimuli affecting said first and at least second portions of said first vehicle, wherein said first condition is satisfied if a first geometry of a said first coil element is different from at least a second geometry of said at least said second coil element, said second condition is satisfied if a first time-varying signal operatively coupled to said first coil element is different from at least a second time-varying signal operatively coupled to said at least said second coil element, and said third condition is satisfied if a first detection process of said at least one detection circuit operative on said first sensed signal component is different from at least a second detection process of said at least one detection circuit operative on said at least said second sensed signal component.

49. A magnetic sensor as recited in claim 48, wherein respective components of said detected signal are normalized with respect to corresponding respective magnitudes of said first sensed signal component and said at least said second sensed signal component.

50. A magnetic sensor as recited in claim 48, wherein respective components of said detected signal are normalized with respect to corresponding respective signal-to-noise ratios of said first sensed signal component and said at least said second sensed signal component.

51. A magnetic sensor, comprising:
a. a plurality of coil elements, wherein at least two coil elements of said plurality of coil elements comprise different numbers of turns;
b. at least one time-varying signal source of at least one time-varying signal operatively coupled to said plurality of coil elements, wherein a first coil element of said plurality of coil elements is adapted to generate a first magnetic field component responsive to said at least one time-varying signal, at least a second coil element of said plurality of coil elements is adapted to generate at least a second magnetic field component responsive to said at least one time-varying signal, and said first coil element and said at least said second coil element are adapted so that said first magnetic field component and said at least said second magnetic field component interact with different first and at least second portions of a vehicle when said plurality of coil elements are in a cooperative relationship with said vehicle; and
c. at least one detection circuit operatively coupled to said plurality of coil elements, wherein said at least one detection circuit generates a detected signal responsive to a first sensed signal component from said first coil element responsive to said first magnetic field component and responsive to at least a second sensed signal component from said at least said second coil element responsive to said at least said second magnetic field component, and said detected signal provides for detecting a change in a magnetic condition of or associated with said vehicle.

52. A magnetic sensor, comprising:
a. a plurality of coil elements, wherein said plurality of coil elements comprise at least first and second coil elements, said first and second coil elements are either separated from one another or overlapping one another, said first and second coil elements are of different sizes, said first coil element surrounds said second coil element, and said first and second coil elements are not concentric with one another;

b. at least one time-varying signal source of at least one time-varying signal operatively coupled to said plurality of coil elements, wherein said first coil element of said plurality of coil elements is adapted to generate a first magnetic field component responsive to said at least one time-varying signal, at least said second coil element of said plurality of coil elements is adapted to generate at least a second magnetic field component responsive to said at least one time-varying signal, and said first coil element and said at least said second coil element are adapted so that said first magnetic field component and said at least said second magnetic field component interact with different first and at least second portions of a vehicle when said plurality of coil elements are in a cooperative relationship with said vehicle; and c. at least one detection circuit operatively coupled to said plurality of coil elements, wherein said at least one detection circuit generates a detected signal responsive to a first sensed signal component from said first coil element responsive to said first magnetic field component and responsive to at least a second sensed signal component from said at least said second coil element responsive to said at least said second magnetic field component, and said detected signal provides for detecting a change in a magnetic condition of or associated with said vehicle.

53. A magnetic sensor, comprising:

a. a plurality of coil elements;

b. at least one time-varying signal source of at least one time-varying signal operatively coupled to said plurality of coil elements, wherein a first coil element of said plurality of coil elements is adapted to generate a first magnetic field component responsive to said at least one time-varying signal, at least a second coil element of said plurality of coil elements is adapted to generate at least a second magnetic field component responsive to said at least one time-varying signal, said first coil element and said at least said second coil element are adapted so that said first magnetic field component and said at least said second magnetic field component interact with different first and at least second portions of a first vehicle when said plurality of coil elements are in a cooperative relationship with said first vehicle, and at least one of said first and at least second portions of said first vehicle is adapted to cooperate with said at least one of said plurality of coil elements;

c. at least one detection circuit operatively coupled to said plurality of coil elements, wherein said at least one detection circuit generates a detected signal responsive to a first sensed signal component from said first coil element responsive to said first magnetic field component and responsive to at least a second sensed signal component from said at least said second coil element responsive to said at least said second magnetic field component, and said detected signal provides for detecting a change in a magnetic condition of or associated with said first vehicle; and d. a conductive element operatively associated with or a part of at least one of said first and at least second portions of said first vehicle so as to cooperate with said at least one of said plurality of coil elements, wherein said conductive element comprises a pattern adapted to control associated eddy currents therein, said conductive element is adapted by either etching, forming or coating said pattern in or on a surface of said conductive element so as to control said eddy currents, and said pattern is adapted to a frequency of said at least one time-varying signal.

54. A magnetic sensor, comprising:

a. a plurality of coil elements;

b. at least one time-varying signal source of at least one time-varying signal operatively coupled to said plurality of coil elements, wherein a first coil element of said plurality of coil elements is adapted to generate a first magnetic field component responsive to said at least one time-varying signal, at least a second coil element of said plurality of coil elements is adapted to generate at least a second magnetic field component responsive to said at least one time-varying signal, said first coil element and said at least said second coil element are adapted so that said first magnetic field component and said at least said second magnetic field component interact with different first and at least second portions of a first vehicle when said plurality of coil elements are in a cooperative relationship with said first vehicle, at least one of said first and at least second portions of said first vehicle is adapted to cooperate with said at least one of said plurality of coil elements, a conductive portion of at least one of said first and at least second portions of said first vehicle is adapted to control associated eddy currents therein, said conductive portion comprises a pattern adapted to control said eddy currents, at least a portion of said conductive portion is adapted by either etching, forming or coating said pattern in or on a surface of said conductive portion so as to control said eddy currents, and said pattern is adapted to a frequency of said at least one time-varying signal; and c. at least one detection circuit operatively coupled to said plurality of coil elements, wherein said at least one detection circuit generates a detected signal responsive to a first sensed signal component from said first coil element responsive to said first magnetic field component and responsive to at least a second sensed signal component from said at least said second coil element responsive to said at least said second magnetic field component, and said detected signal provides for detecting a change in a magnetic condition of or associated with said first vehicle.

55. A magnetic sensor, comprising:

a. a plurality of coil elements;

b. at least one time-varying signal source of at least one time-varying signal operatively coupled to said plurality of coil elements, wherein a first coil element of said plurality of coil elements is adapted to generate a first magnetic field component responsive to said at least one time-varying signal, at least a second coil element of said plurality of coil elements is adapted to generate at least a second magnetic field component responsive to said at least one time-varying signal, said first coil element and said at least said second coil element are adapted so that said first magnetic field component and said at least said second magnetic field component interact with different first and at least second portions of a first vehicle when said plurality of coil elements are in a cooperative relationship with said first vehicle, and said plurality of coil elements are integrated into a trim or gasket portion of said first vehicle; and c. at least one detection circuit operatively coupled to said plurality of coil elements, wherein said at least one detection circuit generates a detected signal responsive to a first sensed signal component from said first coil element responsive to said first magnetic field component and responsive to at least a second sensed signal component from said at least said second coil element responsive to said at least said second magnetic field component, and said detected signal provides for detecting a change in a magnetic condition of or associated with said first vehicle.

56. A magnetic sensor as recited in claim 55, wherein said trim portion comprises either a door trim portion, a body trim portion, or an interior trim portion.

57. A magnetic sensor, comprising:
  a. a plurality of coil elements;
  b. at least one time-varying signal source of at least one time-varying signal operatively coupled to said plurality of coil elements, wherein a first coil element of said plurality of coil elements is adapted to generate a first magnetic field component responsive to said at least one time-varying signal, at least a second coil element of said plurality of coil elements is adapted to generate at least a second magnetic field component responsive to said at least one time-varying signal, said first coil element and said at least said second coil element are adapted so that said first magnetic field component and said at least said second magnetic field component interact with different first and at least second portions of a vehicle when said plurality of coil elements are in a cooperative relationship with said vehicle; said first coil element and said at least said second coil element are incorporated in a sensor assembly adapted mount on a edge of a door of said vehicle, and when said sensor assembly is mounted on said edge of said door, said first coil element faces an exterior of said door, and said second coil element faces an interior of said door; and
  c. at least one detection circuit operatively coupled to said plurality of coil elements, wherein said at least one detection circuit generates a detected signal responsive to a first sensed signal component from said first coil element responsive to said first magnetic field component and responsive to at least a second sensed signal component from said at least said second coil element responsive to said at least said second magnetic field component, and said detected signal provides for detecting a change in a magnetic condition of or associated with said vehicle.

58. A magnetic sensor as recited in claim 57, wherein when said sensor assembly is mounted on said edge of said door, said first coil element faces a proximate pillar of said vehicle.

59. A magnetic sensor as recited in claim 57, wherein said first and second coil elements are substantially magnetically isolated from one another by a shield therebetween.

60. A method of detecting a change in a magnetic condition of a vehicle, comprising:
  a. generating a first time-varying magnetic field component proximate to a first portion of the vehicle at a first location, wherein said first time-varying magnetic field component is responsive to a current through a first coil element;
  b. generating at least a second time-varying magnetic field component proximate to at least one second portion of said vehicle at at least one corresponding second location, wherein said second time-varying magnetic field component is responsive to said current through a second coil element, said at least one second location is separated from said first location, and said first portion of said vehicle and said at least one second portion of said vehicle are at least partially conductive so that said first time-varying magnetic field component generates a corresponding first eddy current component in said first portion of said vehicle, and said at least one second time-varying magnetic field component generates a corresponding at least one second eddy current component in said at least one second portion of said vehicle; and
  c. detecting a change in the magnetic condition of said vehicle responsive to a first signal responsive to said first eddy current component, and responsive to at least one second signal responsive to said corresponding at least one second eddy current component.

* * * * *